US012664987B2

(12) United States Patent　　(10) Patent No.:　US 12,664,987 B2

Madhava et al.　　(45) Date of Patent:　Jun. 23, 2026

(54) COMMUNICATION DYNAMICS METADATA TAGGING FOR TRANSCRIPTION

(71) Applicant: IPC Systems, Inc., Jersey City, NJ (US)

(72) Inventors: Goutham Prasad Madhava, Monroe, CT (US); Elias Koutikas, Oxford, CT (US); Matthew Samuel Murphy, Baldwin Place, NY (US)

(73) Assignee: IPC Systems, Inc., New York, NY (US)

( * ) Notice: Subject to any disclaimer, the term of this patent is extended or adjusted under 35 U.S.C. 154(b) by 237 days.

(21) Appl. No.: 18/534,852

(22) Filed: Dec. 11, 2023

(65) Prior Publication Data

US 2025/0191589 A1　　Jun. 12, 2025

(51) Int. Cl.
*G10L 15/26*　　(2006.01)
*H04L 65/1104*　　(2022.01)

(52) U.S. Cl.
CPC ........... *G10L 15/26* (2013.01); *H04L 65/1104* (2022.05)

(58) Field of Classification Search
None
See application file for complete search history.

(56) References Cited

U.S. PATENT DOCUMENTS

| | | | |
|---|---|---|---|
| 4,998,275 A | 3/1991 | Braunstein et al. | |
| 5,255,264 A | 10/1993 | Cotton et al. | |
| 5,379,280 A | 1/1995 | Cotton et al. | |
| 7,904,056 B2 | 3/2011 | Speranza | |
| 8,189,566 B2 | 5/2012 | Bakshi et al. | |
| 8,290,138 B2 | 10/2012 | Bakshi et al. | |
| 8,363,572 B2 | 1/2013 | Potts et al. | |
| 8,594,278 B2 | 11/2013 | Pappas et al. | |
| 8,599,834 B2 | 12/2013 | Potts et al. | |
| 8,832,304 B2 | 9/2014 | Traynor | |
| 9,191,517 B2 | 11/2015 | Berkowitz et al. | |
| 10,031,717 B2 | 7/2018 | Minutillo et al. | |
| 11,778,090 B1 | 10/2023 | Orbach et al. | |
| 11,798,538 B1 * | 10/2023 | Parker ................... | G10L 15/183 |
| 12,192,183 B1 * | 1/2025 | Kerr ....................... | H04L 12/66 |
| 2010/0158213 A1 | 6/2010 | Mikan et al. | |
| 2012/0016932 A1 * | 1/2012 | de Castro, Jr. ..... | H04L 65/1106 |
| | | | 709/203 |

(Continued)

FOREIGN PATENT DOCUMENTS

EP　　　　2779059　　　　9/2014

OTHER PUBLICATIONS

1 PCT Int'l Search Report and Written Opinion in Appln. PCT/US2024/059212, mailed Mar. 18, 2025, 14 pages.

*Primary Examiner* — Neeraj Sharma

(74) *Attorney, Agent, or Firm* — Merchant & Gould P.C.

(57) ABSTRACT

Communications system used for trading communications that interfaces with a transcription system to enable a service of transcribing trader communications. During an audio call, a stream of audio signals transmitted by a communications device via a user-selected communications line are received together with metadata from the communications device. The audio signals and metadata can be provided during the audio call and via an API gateway to a transcription system in one or more data formats that enable the transcription system to transcribe the stream of audio signals into text and tag the text with the metadata.

18 Claims, 14 Drawing Sheets

(56) References Cited

U.S. PATENT DOCUMENTS

| | | | |
|---|---|---|---|
| 2014/0244447 A1* | 8/2014 | Kim | G06Q 30/0643 705/27.2 |
| 2015/0073790 A1* | 3/2015 | Steuble | G10L 15/26 704/235 |
| 2017/0310716 A1 | 10/2017 | Lopez Venegas et al. | |
| 2018/0139307 A1* | 5/2018 | Gausman | H04L 47/70 |
| 2019/0228774 A1* | 7/2019 | Chevrier | G10L 15/22 |
| 2021/0021706 A1 | 1/2021 | Simerson et al. | |
| 2022/0292259 A1 | 9/2022 | Carpenter, II et al. | |
| 2023/0007063 A1 | 1/2023 | Gupta et al. | |
| 2024/0098089 A1* | 3/2024 | Adogla | H04L 63/107 |
| 2025/0053735 A1* | 2/2025 | Shevchenko | G06F 40/30 |
| 2025/0168253 A1* | 5/2025 | Heimler | G06F 16/252 |
| 2026/0019505 A1* | 1/2026 | Fahlgren | H04M 3/5232 |

* cited by examiner

Trading Session Data 610A

Header Data 624A

Media Data 612

Trading Session Data 610B

Header Data 624B

Communications Dynamics Metadata 614

Communications Line 616

Communications Device 618

Push-To-Talk Status 620

Timestamps for Push-To-Talk Activation/Deactivation 622

1000

1300

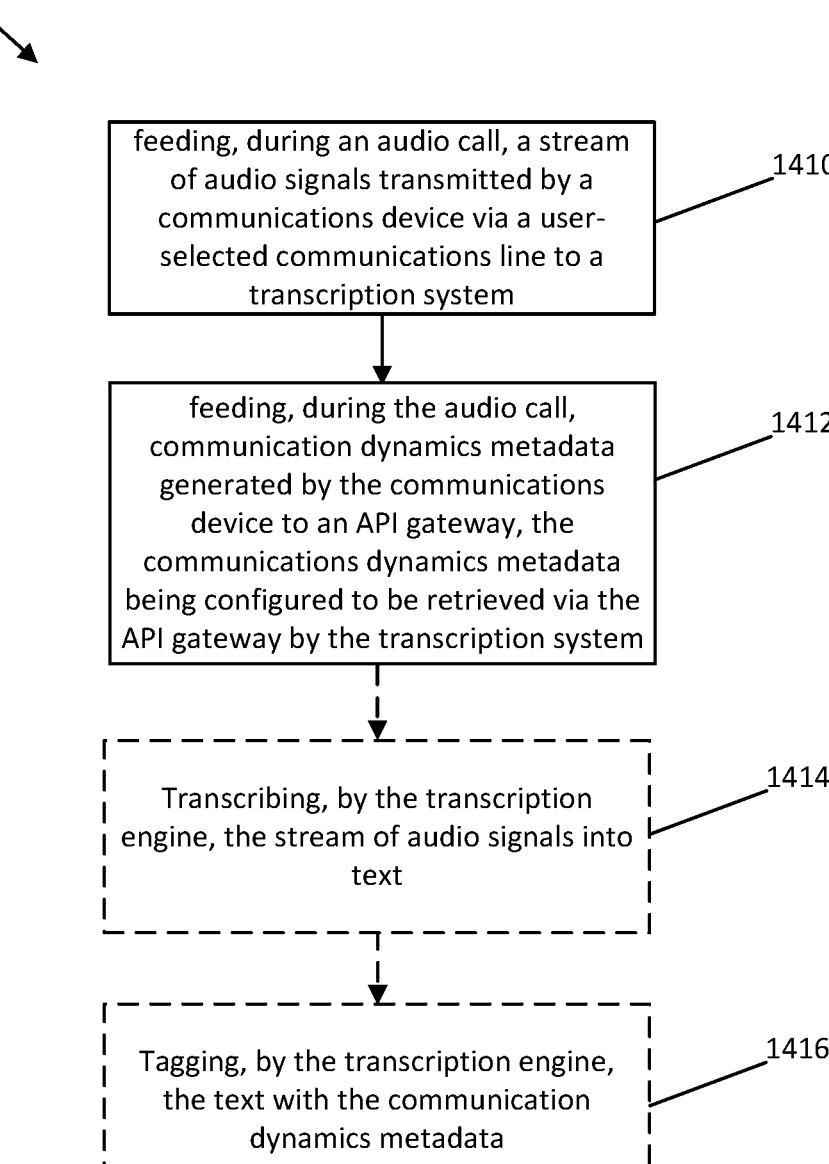

1400 feeding, during an audio call, a stream of audio signals transmitted by a communications device via a user-selected communications line to a transcription system — 1410 feeding, during the audio call, communication dynamics metadata generated by the communications device to an API gateway, the communications dynamics metadata being configured to be retrieved via the API gateway by the transcription system — 1412

Transcribing, by the transcription engine, the stream of audio signals into text — 1414

Tagging, by the transcription engine, the text with the communication dynamics metadata — 1416

FIG. 14

COMMUNICATION DYNAMICS METADATA TAGGING FOR TRANSCRIPTION

BACKGROUND

A trading communications system represents a specialized switching infrastructure tailored to grant a relatively small number of users access to a vast array of external lines. This system offers an array of advanced communication functionalities, including hoot-n-holler, push-to-talk, intercom, video capabilities, and large-scale conferencing. A turret device, also referred to simply as a "turret," serves as the component allowing a user to manage multiple dedicated and always-active communication lines, facilitating simultaneous communications with multiple parties. Turret devices may incorporate dual handsets, multichannel speaker modules, and support several communication lines.

A trading turret device can be implemented either in dedicated hardware, termed a "hard" turret, or in software, known as a "soft" turret. A hard turret typically manifests as a phone-like desktop device equipped with multiple handsets, speakers, and buttons. Conversely, a soft turret exists as a software application that operates on a trader's desktop personal computer (PC) or mobile devices like smartphones. Control of a soft-turret application occurs through the native control interface provided by the computer, including touch screens, styluses, click wheels, or mouse and keyboard inputs. In addition to displaying a graphical representation of the turret on the PC screen, the soft-turret application may also offer voice and presence features. A soft turret can also be implemented by a combination of a PC or mobile device and connected hardware components such as one or more handsets, speakers, and buttons, providing flexibility in its configuration and usage.

Traders use turrets to initiate calls for placing trades on securities. These trades demand minimal delay in execution, requiring the high-speed connections offered by turret systems to swiftly connect the involved parties. Given the fast-paced nature of financial trading, these calls and interactions typically transpire within seconds, as traders swiftly process information and make decisions.

The regulatory landscape surrounding financial trading has significantly tightened, demanding traders' adherence to an ever-growing array of stringent rules and compliance measures. Amidst this rapidly evolving environment, a pressing technical challenge emerges concerning the accurate recording of trading events conducted through the trading communication system. Complex situations often arise: for instance, when additional users join ongoing calls or when a trader initiates speaking during the conversation. These scenarios pose difficulties as the existing system infrastructure lacks the requisite capability to effectively capture and log such nuanced events, and more so in synchronization with transcriptions of the conversations. Although transcription methods prove effective in generating text-based records of spoken dialogues, the prevailing systems grapple with the task of precisely tracking and documenting events that transpire beyond the boundaries of conventional speech interactions and into the hardware components associated with the communications.

Typical transcription services typically offer restricted metadata pertaining to the call itself. This limited metadata often includes fundamental details such as timestamps indicating the time and duration of the call, caller IDs, basic call quality metrics (like the count of dropped packets), and some specifics sourced from the content's origin (e.g., the communications device supplying the content) and its connected network.

In conventional communications systems, information regarding the communication device itself—distinct from the communication's content—can be acquired and relayed to a remote application. This metadata commonly encompasses various details of the device, such as the device's unique identifier (e.g., IMEI for mobile devices), location information, timestamps, call logs, duration of calls, IP addresses, operating system name and version, application data, user accounts, credentials, system settings (like device preferences and network configurations), browsing history, cookies, and even biometric data.

Different methods exist to gather such metadata from the communication device, including device logs, network monitoring, and application programming interfaces (APIs) along with software interfaces installed on the device. Nevertheless, within the realm of securities trading, certain additional hardware and data, not accessible via regular communications devices, come into play—such as a turret, for instance. In the securities trading domain, laws and regulations mandate secure transmission and comprehensive logging of sensitive financial information.

Moreover, the communications system, including specific hardware components like turrets, necessitates meticulous logging beyond the ordinary metadata. These specialized components hold significance within the trading infrastructure, requiring comprehensive tracking and monitoring to ensure compliance with established regulations. Determining the specific hardware devices, types of communication lines, and other relevant data employed for trader communications, after the fact, poses technical challenges or might even be unattainable. This complexity arises when trying to ascertain compliance with applicable communications laws and regulations by traders or other participants in conference communications. Syncing such metadata with information derived from the content of the communications itself presents further complexities and challenges.

It is with respect to these and other general considerations that embodiments have been described.

SUMMARY

In general terms, the present disclosure is directed to providing communications dynamics metadata to a transcription service.

In further general terms, the present disclosure is directed to a communications system configured to interface with each of a plurality of different transcription systems.

One aspect of the present disclosure involves a system for transcribing audio calls during a trading session. The system for transcribing audio calls during a trading session comprises: one or more processors; and one or more memory devices coupled to the one or more processors and storing data instructions that, when executed by the one or more processors, cause the one or more processors to: feed, during an audio call, a stream of audio signals transmitted by a communications device via a user-selected communications line to a transcription system; and provide, during the audio call, communication dynamics metadata generated by the communications device to an application programming interface (API) gateway, the communications dynamics metadata being configured to be retrieved via the API gateway by the transcription system, the communication dynamics metadata indicating at least one of: (i) an audio source of a plurality of audio sources of the communications device; (ii) a type of the user-selected communications line; (iii) a type of a switch on the communications device that has been activated to enable a user's voice received at the communications device to be transmitted as the stream of audio signals via the user-selected communications line; (iv) a first time when the switch was activated and a later second time when the switch was deactivated; or (v) a third time between the first time and the second time when the stream of audio signals began.

In yet another aspect of the present disclosure, a non-transitory computer-readable medium has stored thereon one or more sequences of instructions for causing one or more processors to perform: feeding, during an audio call, a stream of audio signals transmitted by a communications device via a user-selected communications line to a transcription system; and providing, during the audio call, communication dynamics metadata generated by the communications device to an API gateway, the communications dynamics metadata being configured to be retrieved via the API gateway by the transcription system, the communication dynamics metadata indicating at least one of: (i) an audio source of a plurality of audio sources of the communications device; (ii) a type of the user-selected communications line; (iii) a type of a switch on the communications device that has been activated to enable a user's voice received at the communications device to be transmitted as the stream of audio signals via the user-selected communications line; (iv) a first time when the switch was activated and a later second time when the switch was deactivated; or (v) a third time between the first time and the second time when the stream of audio signals began.

Additional aspects and features of the present disclosure will be made apparent by the following description and the appended drawings.

BRIEF DESCRIPTION OF THE DRAWINGS

Non-limiting and non-exhaustive examples are described with reference to the following figures.

FIG. 14 illustrates a method for providing data for transcription using the communication system, transcription system, and user communication device of FIG. 1 according to an example embodiment.

DETAILED DESCRIPTION

Figure 1:
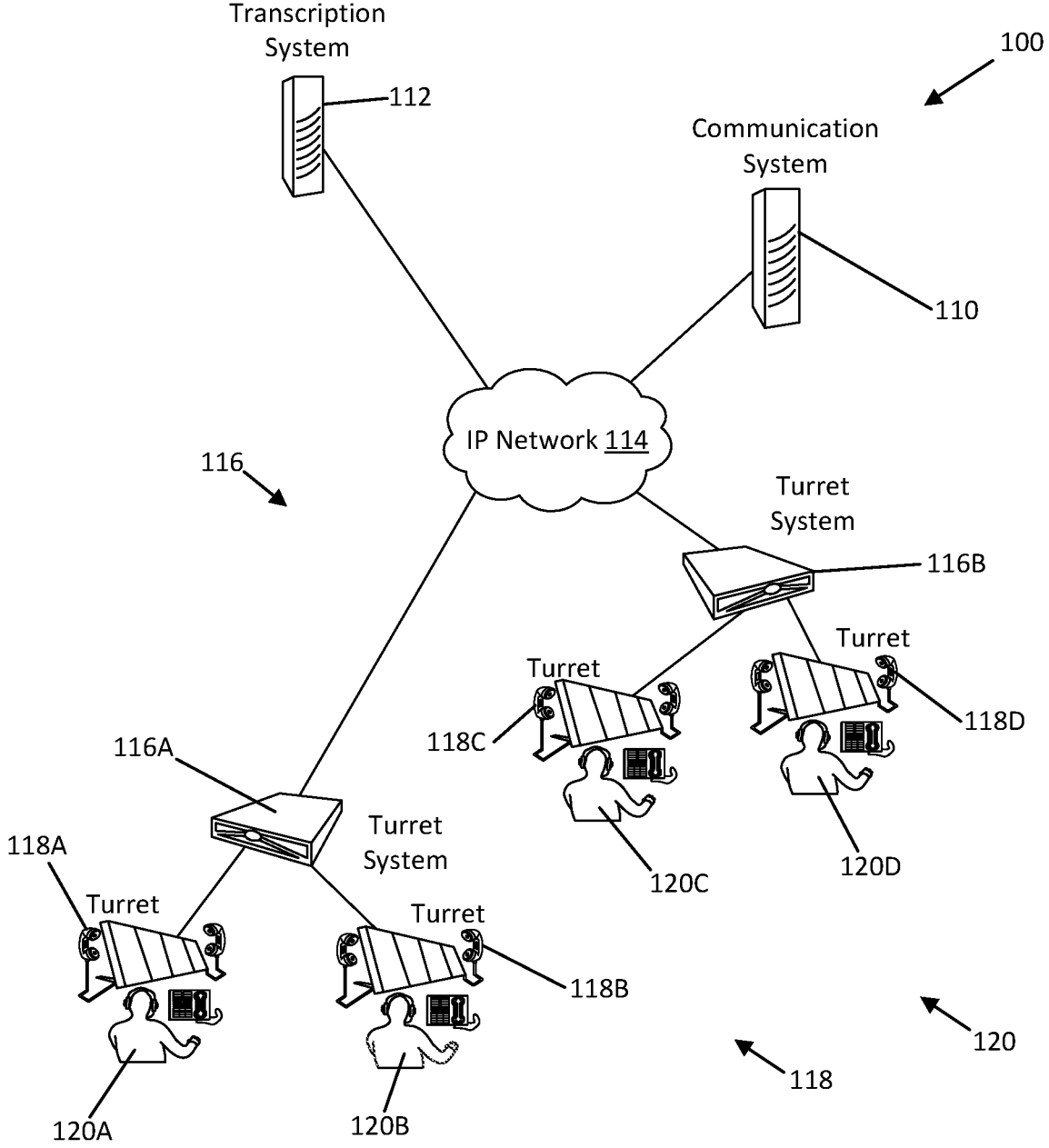
FIG. 1 illustrates a trading environment utilizing a transcription system according to an example embodiment.

This description is not intended to limit the application of the example embodiments presented herein. In fact, after reading the following description, it will be apparent to one skilled in the relevant art(s) how to implement the following example embodiments in alternative embodiments. In addition, not all of the components described herein are required to practice the disclosed systems, devices or methods, and variations in the arrangement and type of the components may be made without departing from the spirit or scope of the disclosure. As used herein, the term "component" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

In the several drawings, like numbers refer to like components.

I. Definitions

Some terms are defined below for easy reference. However, it should be understood that the defined terms are not rigidly restricted to their definitions. A term may be further defined by its use in other sections of this description.

"Device" as used herein, generally refers to software, hardware or a combination thereof. A device may sometimes be referred to as an apparatus. Examples of a device include without limitation a laptop computer, a desktop computer, a hard turret, a soft turret, a headset, a handset, any hardware or software capable of converting an utterance into an audio signal, any hardware or software capable of transmitting or receiving an audio signal, any hardware or software capable of converting an audio signal into sound, database, a server, a display, a computer mouse, a hard disk.

"Network" as used herein, generally refers to a connection between any two or more devices, which permits the transmission of data. A network may be any combination of networks, including without limitation the Internet, a network of networks, a local area network (e.g., home network, intranet), a wide area network, a wireless network, and a cellular network.

"Private line" as used herein, generally refers to a dedicated communication channel or circuit that is exclusively used by specific parties for transmitting data, voice, or other forms of communication. In the context of telecommunications or networking, a private line is a dedicated connection that is not shared with other users or the public. It offers a secure and direct point-to-point link between two locations, ensuring privacy, reliability, and often faster transmission speeds compared to shared or public communication lines.

"Software" and "application" as used herein, generally refer to a computer program that is written in a programming language that may be used by one of ordinary skill in the art. The programming language chosen should be compatible with the computer by which the software application is to be executed and, in particular, with the operating system of that computer. Non-limiting examples of suitable programming languages include without limitation C, C++, and Java. Further, the functions of some embodiments, when described as a series of steps for a method, could be implemented as a series of software instructions for operating by one or more processors, such that the embodiments could be implemented as software, hardware, or a combination thereof. Non-transitory computer-readable media are discussed in more detail in a separate section below.

"Speakerphone" or "conference speaker" or "intercom" as used herein, generally refers to a telecommunications device that allows for hands-free communication during phone calls or conferences. It typically incorporates a loudspeaker that enables multiple individuals to participate in a conversation without physically holding the phone to their ear or using a headphone. Typically, a speakerphone has a microphone built into the device, allowing users to speak while being heard by the other party or multiple participants.

"System" as used herein, generally refers to a device or multiple coupled devices. A device is defined above.

"Communication dynamics metadata" as used herein, generally refers to descriptive information that captures and chronicles various dynamic elements and intricacies involved in communication interactions in a trading environment. This metadata can include, for example, a range of contextual details and temporal markers related to the behavior, actions, and changes occurring within communication systems during interactions, such as voice-based conversations or audio calls involving turret devices.

II. Overview

Embodiments of the present disclosure are directed to a communications system used for trading communications that interfaces with a transcription system to enable a service of transcribing trader communications. The communications system establishes a media session with the transcription system for every communications session between two or more communications devices.

In certain aspects, embodiments of the present technology relate to a vendor-neutral, standards-oriented interface for session signaling, media, and communication dynamics metadata exchange between a communications system and a transcription system.

Providing communication dynamics metadata to a transcription system in financial trading communication environments (e.g., communications between trading desks), allows for the communication dynamics metadata to be processed and analyzed to determine whether certain compliance regulations have been met. In some embodiments, a transcript can be tagged with communication dynamics metadata, where the communication dynamics metadata indicates specific information about physical aspects of the communications, such as the type of communication line (e.g., a ringdown line, a private line, a hoot-n-holler line etc.), which buttons (e.g., push to talk buttons) were pressed by participants during the conversation, which audio source and hardware (e.g., handset (including which handset of a device, such as between a left handset and a right handset of a turret device), headset, intercom, hard turret device, soft turret device, desktop computer, smartphone, laptop computer, tablet device, wearable communications device (e.g., a watch, soft phone PBX phone, etc.) was used by each participant, the identity of each participant, start and end times for when each participant talks, and the like.

In the context of the securities trading field, using a private line indicates a secure and exclusive channel for communication, which is essential for transmitting sensitive financial information in compliance with legal requirements. In the securities trading field, certain types of communications are conducted privately over a private line and without the use of a conference speaker, or any form of shared audio output. This requirement ensures confidentiality and compliance with legal regulations regarding the transmission of sensitive information in the securities trading industry.

Communication dynamics metadata holds particular relevance and importance in financial trading environments and, particularly the types of communications devices (both hardware and software) that are used in financial trading environments, such as turret devices. The financial trading environment can present atypical types of communications devices, atypical communications device functionality, and atypical compliance issues that pertain particularly to how those trading environment communications devices are used during a trading environment scenario. Collecting communication dynamics metadata and providing that communication dynamics metadata to a transcription system so that the transcription system can record and tag a transcript of a conversation from a trading environment with the collected communication dynamics metadata is thereby an advantageous improvement in managing and operating specific types of communications technology, such as turret devices, in specific contexts and technological fields, such as a trading communications environment.

Advantageously, aspects of the present disclosure can allow for highly specific communications data, including communications data that is relevant to legal and regulatory compliance, to be recorded in a transcript of the communication, thereby facilitating after-the-fact understanding of aspects of the communication that can implicate one or more laws or regulations.

The example embodiments are described herein in terms of example network communication messaging protocols (e.g., Session Initiation Protocol (SIP), Voice over Internet Protocol (VOIP), the Transport Layer Security (TLS) cryptographic protocol, Session Description Protocol (SDP)). This description is not intended to limit the application of the example embodiments presented herein. In fact, after reading the following description, it will be apparent to one skilled in the relevant art(s) how to implement the following example embodiments in alternative embodiments (e.g., involving other communication messaging protocols using within private and public communications systems).

III. Environment

FIG. 1 illustrates a trading environment utilizing a transcription system according to an example embodiment. In this embodiment, a trading environment 100 includes both a communication system 110 and a transcription system 112 communicatively connected to an internet protocol (IP) network 114. Through this connection, the communication system 110 and the transcription system 112 exchange data, including transcription data, through an Application Programming Interface (API). Also, the turret systems 116 (which include turret system 116A and 116B) are communicatively connected to an IP network 114. User communication devices 118 (which include user communication devices 118A, 118B, 118C, and 118D) communicatively connect to respective turret systems 116 to allow users 120 (which include users 120A, 120B, 120C, and 120D) to communicate over the connection through the Internet Protocol (IP) Network 114. In this embodiment, users 120 are traders. Further, the user communications device 118 is configured to select a specific transcription system chosen by one of the users 120 and provide transcription services. Although not shown, a plurality of transcription systems may be available to provide transcription services when connected to communication system 110.

The trading data including communication dynamics metadata and other metadata is transmitted through IP network 114 to the communication system 110. The communication system 110 is configured to feed the stream of audio signals to the transcription system 112 in one or more data formats. Further, the communication system 110 connects to an API gateway (described in FIG. 2) to transmit the communication dynamics metadata. Then, the communication system 110 may cause the transcription system 112 to transcribe the stream of audio signals into text and tag the text with the communication dynamics metadata. Thus, the users 120 are configured to operate a trader platform application with transcription capabilities from their respective user communication devices 118.

In the illustrated embodiment, the users 120 are operating a trading platform that includes placing calls to other traders, brokers, or others involved in the trading process at user communication devices 118. The user communication devices 118, in some embodiments, are turrets or conventional telephones. Connections between these user communication devices 118 are established through either private or public lines, via respective networks, ultimately linking to the IP Network 114 and interfacing with turret systems 116. As described above, a turret device can have dual handsets, multichannel speaker modules, and support several communication lines. In an example implementation each user communication device 118 includes multiple handsets and provides a user interface which allows users to access and use resources. Similarly, users of softphone (not shown) or a Private Branch Exchange (PBX) phone can access and use turret system resources available to them. In an example embodiment, a session initiation protocol (SIP) line card (not shown) in user communication device 118 operates as a SIP gateway to the switching fabric of the turret system 116. A turret system 116 can communicate with other turret systems, at least one PBX switch, or at least one remote computing device (not shown) over IP network 114.

As an example, user 120A may place a call to user 120D. The communication system 110 provides the communication infrastructure by providing a media session to manage the call and connect both traders.

The communication system 110 connects the transcription system 112 to the call to provide transcription services. As the conversation progresses between user 120A and 120D, the transcription system 112 transcribes the conversation in real time to written form by receiving audio data in real time that was captured by the communication system 110. The communication system 110 also captures communication dynamics metadata associated with the conversation in real time, such as the types of communication dynamics metadata described herein. The communication dynamics metadata is captured from call events that occur during a call session. Call events are descriptive occurrences during the call that provide context of different features of the call. For example, a call event can be a particular phone line answering a call and providing audio for that session. Other examples include one or more communications devices joining a call, a push-to-talk switch being activated, or a push-to-talk switch being de-activated. Many different descriptors of the call session can be provided as call events. These call events are then sent as call event data to communication system 110 along with call audio data. The communication system 110 then provides the call events as communication dynamics metadata to the transcription system 112 for tagging the transcription.

The transcription system 112 tags the communication dynamics metadata and, in some examples, other metadata, of the communication to the transcription. For example, when user 120A activates a switch, e.g., presses a PTT button or other switch to enable their microphone that is part of one of the user communication devices 118, communication dynamics metadata indicating that the PTT button was pressed, the time it was pressed, and the device on which it was pressed is captured and transmitted through the communication system 110 and the API gateway. Either the user communication devices 118 or the communication system 110 may capture the communication dynamics metadata event for tagging. The transcription system 112 tags the transcription of the audio signals with the corresponding communication dynamics metadata, thereby associating a portion of the transcript with communication dynamics metadata that describes the communications device that was being used how and when that communications device was engaged (e.g., when the PTT buttons was pressed).

The PTT button is one example of how a trader of users 120 mutes or unmutes the audio transmission on a speaker call. Speaker calls are typically long-lived hoot or ring down circuits where the trader listens and speaks at varying rates (e.g., listen/speak examples 80/20, 50/50, 20/80, etc.). The PTT button can also be latched, which means that the trader does not have to hold it down while speaking. The PTT button or switch may be a hard button or soft button. After pressing the PTT button, the user communication device 118 detects the pressed PTT button as an event and transmits data indicating that the PTT button is pressed. The communication system 110 then captures the event and generates communication dynamics metadata indicating the occurrence of the event and transmits the communication dynamics metadata to the transcription system 112 based on a monitor that informs the communication system 110 to capture these events. The communication system 110 then provides the communication dynamics metadata using the API gateway to the transcription system 112. The audio data is also transmitted to transcription system 112 over a separate path. The transcription system 112 will tag the transcribed text with the communication dynamics metadata to indicate the occurrence of the push-to-talk event to an entity that might consult the transcription to review what occurred during the call. For example, a compliance officer may analyze the transcription including the tagged communication dynamics metadata to determine which user of users 120 pressed the PTT button and was speaking the transcribed words.

Other communication dynamics metadata may include the type of device used to place the call, a type of communication line selected (e.g., a POTS line, a VOIP line, a video line, a ringdown line, a private line, a hoot-n-holler line, etc.), a type of switch or button activated on the communication device to enable a user's voice, a first time when the switch was activated and a second time when the switch was deactivated, or a third time when a stream of audio signals began from user communication device 118. Software is configured to enable the communication system 110 to capture this communication dynamics metadata. The software also enables the communication system 110 to send the communication dynamics metadata and other metadata to the communication system 110 such that the communication dynamics metadata and other metadata is formatted to be processed by the transcription system 112 and recorded in the transcription. The software can reside locally (e.g., on the user communication device 118) or remotely, e.g., in a Cloud accessible via a web application running on the user communication device 118. While the communication system 110 is described as capturing the communication dynamics metadata event, other embodiments include configuring the user communications device 118 to capture the metadata event, generate communications dynamics metadata, and transmit to the communication system 110 for feeding through the API gateway to the transcription system 112. In some embodiments, the API gateway 210 generates the communications dynamics metadata based on received event data from the communication system 110.

In some embodiments, the communication dynamics metadata includes the type of device that was enabled with push-to-talk and which entity pressed the push-to-talk switch.

In still other embodiments, the communication dynamics metadata and/or other metadata along with the transcription can be automatically analyzed and evaluated by third-party software, e.g., for compliance assessment purposes.

IV. Systems and Architecture

Figure 2:
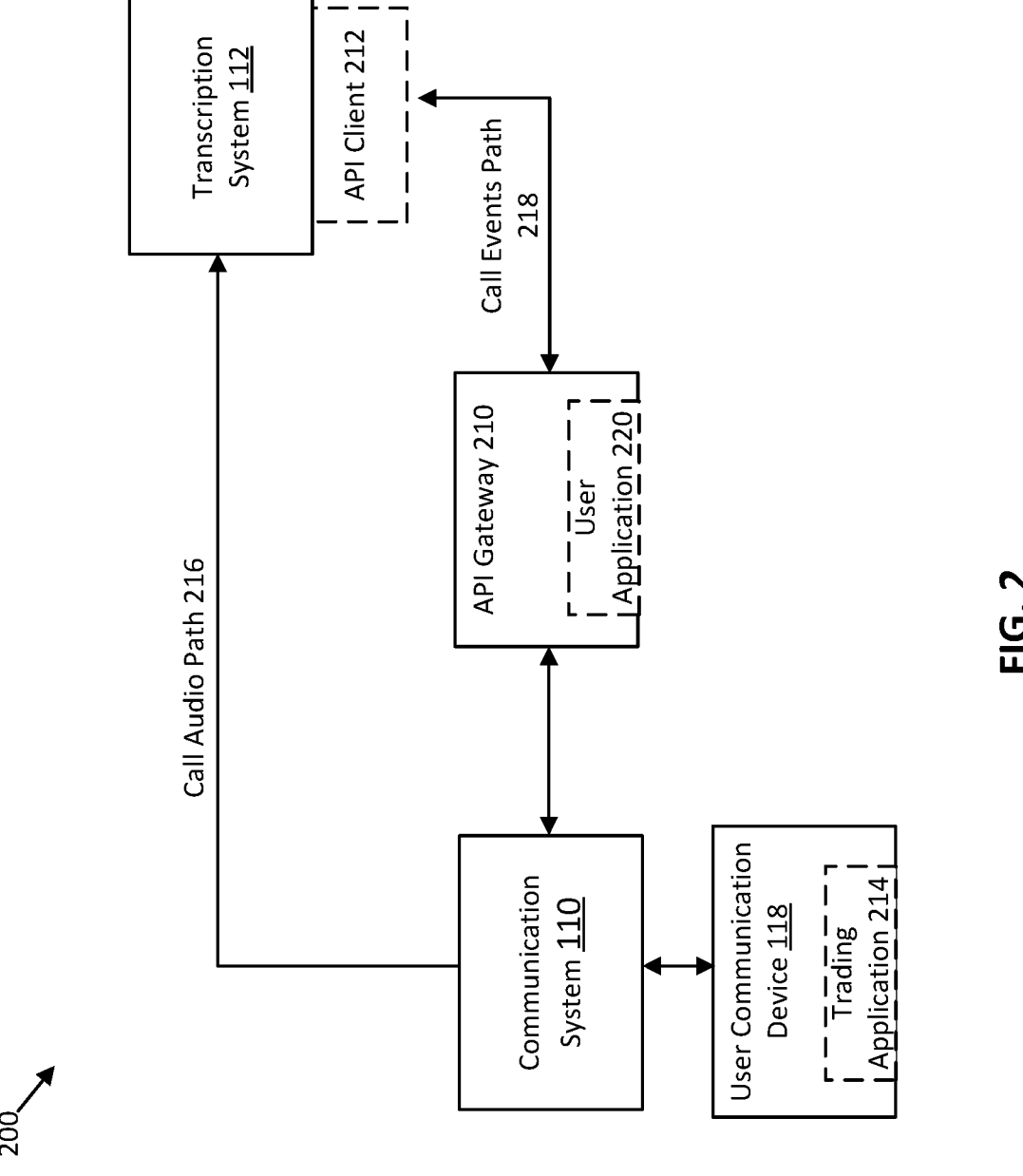
FIG. 2 illustrates a block diagram of communication paths between the communication system and a transcription system of the trading environment of FIG. 1 according to an example embodiment.

FIG. 2 illustrates a block diagram of a communication path between the communication system and a transcription system of the trading environment of FIG. 1 according to an example embodiment. In the shown embodiment, the user communication device 118 transmits its data, including call event data and audio data to communication system 110. Once the communication system receives the data from user communication device 118, the communication system 110 feeds the call session audio along the call audio path 216, which is fed from a connected user-selected communications line, directly to the transcription system 112. The transcription system 112 is a selected transcription system for providing transcription services and the call audio path 216 connects the transcription system 112 to the communication system 110. The communication system 110 also captures communications dynamics events from the received data transmitted by the user communications device 118, and the communication system 110 further generates the communications dynamics event metadata. The communications dynamics event metadata is then provided by the communication system 110 to the API gateway 210. The transcription system 112 retrieves the communications dynamics event metadata from the API gateway 210 over the call events path 218. Both the audio data and retrieved communication dynamics metadata are configured in one or more data formats to allow for transcription of the audio and tagging of the transcribed audio. Optionally, the transcription system 112 includes an API client 212 to access the API gateway 210, and the user communication device 118 optionally includes a trading application 214. Further, the API gateway 210 may include a user application 220 configured to extract metadata from an extensible markup language (XML) file. The transcription system 112 retrieves the extracted metadata from the user application using the API gateway 210 to tag, by the transcription system, transcribed text of the stream of audio signals with the extracted metadata.

In the shown embodiment, the user communication device 118 connects to the communication system 110 using an SIP interface to initiate the session (discussed further in connection with FIG. 8) and Call Detail Record (CDR) report over an API. A CDR is a data record that captures information about a telecommunication transaction, such as who initiated the call, who is the target of the call, and the duration of the call. The communication system 110 is configured to use a media session interface that operates using Real-time Transport Protocol (RTP) to transmit the audio data over the call audio path 216 to the transcription system 112 based on the transcription system Uniform Resource Locator (URL) that is associated with the transcription system 112's IP address. The URL or address may be received by the communication system 110 through a user interface generated at, e.g., the user communication device 118. RTP allows for discontinuous transmission (i.e., silence suppression) on any audio codec by observing the first packet after the silence has a non-contiguous RTP timestamp with the end of the interval covered by the first packet even though the RTP sequence number has incremented by only one. The transcription system 112 may use any audio compression/decompression technique for transmission of the captured speech. For example, the transcription system 112 in this embodiment support/negotiate with silence suppression using the G.711 and G.729 to have better transcription accuracy. The G.711 codec is a narrowband audio codec that provides uncompressed audio at 64 kbits/s and is also known as pulse code modulation while G.729 is a compression process that compresses speech into 10 units of 10 milliseconds that uses algebraic code excited linear prediction (ACELP). In addition, the communication system 110 uses a REST API to feed the communications dynamics metadata to the API gateway, which is the accessed by the API client 212 to provide the communications dynamics metadata to the transcription system 112 for tagging. A REST API generally defines the parameters for exchanging data between different applications and services. The REST API generally uses standard hypertext transfer protocol (HTTP) requests, such as GET, POST, PUT, and DELETE, to communicate with other applications and perform basic database functions.

The API gateway 210, in this embodiment, includes an individual client associated with a particular entity and is part is of a larger API gateway server that is also included with API gateway 210, the individual client identified as user application 220. The larger API gateway server may receive the call events data from the communication system 110 and pass the call events the user application 220 of the API gateway 210. Multiple clients may be associated with and separately configured within API gateway 210 and connected to selected devices. Each individual API gateway client, such as user application 220, may have its own configured settings and selected transcription system as well. Once it receives the call events, the API gateway 210 extracts information such as the organization call-ID and transmits the metadata associated with the call events to the transcription system 112 over call events path 218. The API gateway 210 may optionally connect to deployed device side applications that can access API gateway 210, such as trading application 214 and API client 212. In this embodiment, the organization call-ID is generated by the communication system 110 when a user 120 accesses an idle/available line. Once generated, the organization call-ID is associated with the line and is available to all connected turret systems 116 and user communication devices 118. In addition, any user that accesses the associated line is tagged with the same organization call-ID. Thus, the organization call-ID enables the communication system 110 to list all users involved in a call using the specific line that is associated with the organization call-ID.

Further, the API gateway 210 includes a computer telephony integration (CTI) monitor for the transcription service enabled use. This monitor is responsible for connecting a phone system to a computer program that provides details about the caller such as the caller's name. CTI enables the user to manage a phone system directly from their computer. The CTI monitors are created by the transcription system 112 for the API gateway 210. The API gateway uses the CTI monitors to interface with the communication system 110 and direct the communication system to capture specified events. These CTI monitors also monitor for specified call event data using the communication system 110. Once the monitors are created by the transcription system 112, the monitors configure the communication system 110 to feed the specified call event communications dynamics metadata to the API gateway 210 for holding until polled. The transcription system 112, in this embodiment, subscribes to the created monitors to select the desired metadata for tagging the transcription. The CTI monitors may be stored within the user application 220.

The transcription system 112 communicates with the API gateway 210 through a REST API. The transcription system 112 polls the API gateway 210 for metadata. After polling the API gateway 210, the API gateway 210 sends the metadata to the transcription system 112. In other embodiments, the API gateway 210 can connect to the deployed API client 212 included with the transcription system, and the API client 212 polls the API gateway 210 for the communications dynamics metadata The API client 212 is coupled with the transcription system such that the metadata is directly made available. In still other embodiments, the transcription system 112 polls the API gateway 210 for metadata. When polled, the transcription system 112 will receive the metadata sent by the API gateway 210 responsive to the polling.

Both the API gateway 210 and the SIP call session initiated over the call audio path 216 are configured to include the organization call-ID number for the transcription system 112 to use to associate the transcripts with the metadata. Accordingly, the stream of audio signals and the communications dynamics metadata have associated therewith the same identifier, where the identifier is associated with the call involving the user communications device 118. In this embodiment, the identifier is a organization call-ID that identifies a particular call session. The organization call-ID is integrated with all messages sent to the transcription system; and the organization call-ID is then used by the transcription system to associate the text with the communications dynamics metadata that both came from the same call session. Using the organization call-ID, the transcription system 112 can tag the transcription that corresponds to the correct organization call-ID.

In one example, user 120A may call user 120D and begin a transcription session for both callers. As the call begins, communication system 110 will note the start of call on a transcript that user communication device 118A initiated a call with user communication system 118D. User 120D picks up the called phone that is part of user communication device 118D and presses a PTT switch. Communication system 110 notes this event and uses API gateway 210 to send the communications dynamics metadata indicating the event to the transcription system 112 to tag the transcription. Each user talks and both users' speech is transcribed and tagged with any corresponding call events through the communications dynamics metadata. After a passing of time, user 120C joins the call, which communication system 110 captures this event and generates the communications dynamics metadata that is provided to the API gateway 210 for delivery to transcription system 112. The transcription system 112 then tags the transcription noting the event. If user 120C presses a PTT button, the communication system will ensure delivery of the corresponding communications dynamics metadata to the transcription system 112 for tagging. All metadata associated with this particular call includes an embedded organization call-ID identifying this call session between user 120A, user 120D, and user 120C. While described as three individuals as part of the call, other embodiments include any number of participants. For example, a user may initiate a transcription system where they are the only participant, so the transcription system transcribes their speech for note taking purposes. In addition, users outside the turret system may also be part of the call session and have their speech transcribed and call events tagged to the transcription.

In additional embodiments, the communication system 110 embeds the communications dynamics metadata in call events associated with the audio call. The call events are then provided to the API gateway 210 (discussed further in association with FIG. 10 and FIG. 11). Further, the API gateway may convert the call events into one or more XML file. The user application 220 is then configured to extract the communications dynamics metadata from the one or more XML files to provide extracted metadata to the transcription system 112. In additional embodiments, the individual client of the API gateway 210 also extracts the communications dynamics metadata from the one or more XML files to provide extracted metadata.

While each of the communication paths and connections are described as using specific protocols, other protocols and formats may be used.

Figure 3:
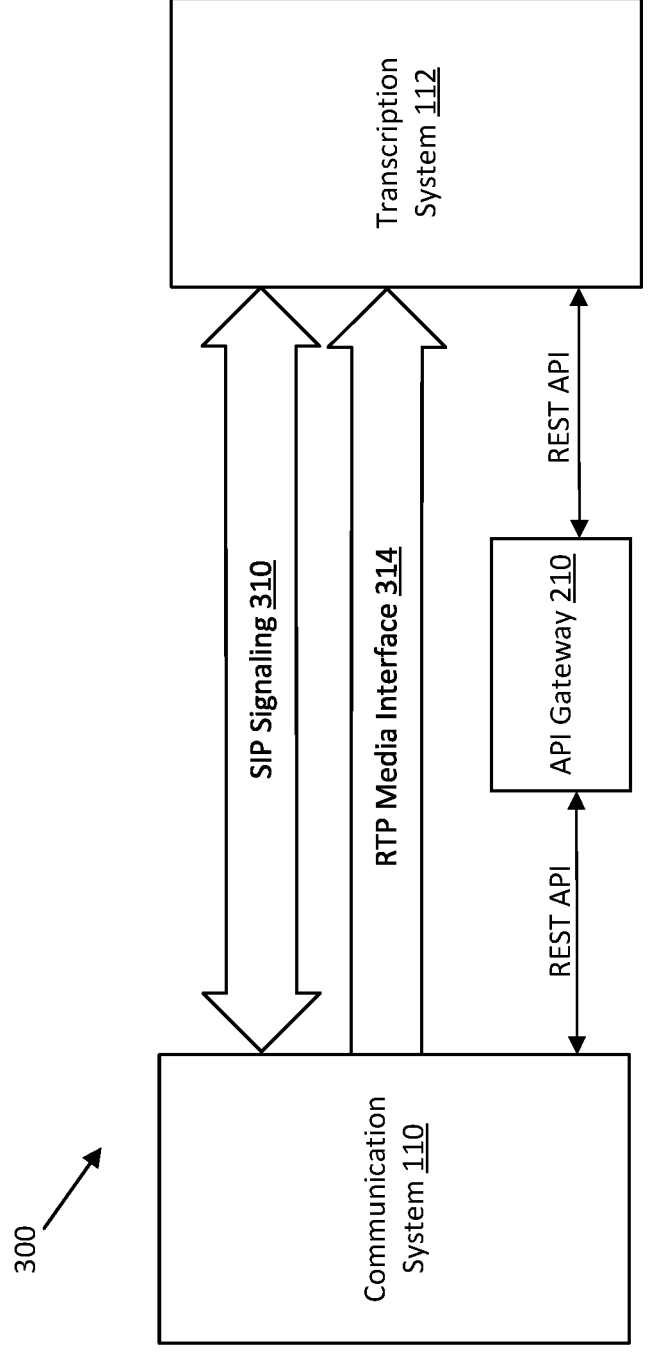
FIG. 3 illustrates a block diagram of an integration architecture of the communication system of FIG. 1, transcription system of FIG. 1, and the API gateway of FIG. 2 according to an example embodiment.

FIG. 3 illustrates a block diagram of an integration architecture of the communication system of FIG. 1, transcription system of FIG. 1, and the API gateway of FIG. 2 according to an example embodiment. In the shown embodiment, the communication system 110 and the transcription system connect call sessions through SIP Signaling interface 310 over TLS. Further, the communication system 110 and the transcription system 112 exchange metadata between one another through the API gateway 210. Further, the communication system 110 transmits call audio data over the RTP media interface 314. Both the SIP signaling interface 310 and RTP media interface 314 connect over the call audio path 216. In addition, communications dynamics metadata is transmitted using the REST API to API gateway 210 and the transcription system 112 retrieves the metadata using a REST API. The transcription system 112 additionally tags the transcription with the metadata.

To communicate data between the communication system 110 and the transcription system 112, the SIP signaling interface 310 uses Session Initiation Protocol (SIP) over the Transport Layer Security (TLS) cryptographic protocol and Session Description Protocol (SDP) in this embodiment. Moreover, the SIP signaling interface 310 provides the mechanism for the communication system 110 to create and send media to the transcription system 112. This media is meant for the consumption of the transcription system 112 to transcribe trader conversations. The SIP signaling interface 310 in the shown embodiment is based on the SIP. SIP is used to establish RTP media sessions between the two sides of the interface. The communication system 110 establishes a separate SIP session for each audio source (e.g., left handset, right handset and intercom channel) of a transcription feature enabled user, such as users 120. Each session will contain each participating user's 120 audio mixed with that of all other parties in the conversation. The SIP session is established when a first transcription feature enabled trader initiates a conversation and the sessions lasts until the last transcription featured enabled trader leaves the conversation. In this manner, every party involved in the conversation will be part of session and is transcribed. More details of this process are described in connection to FIG. 8.

The RTP media interface 314 refers to the actual exchange of media (audio signals) between the communication system 110 and the transcription system 112. Further, the RTP media interface 314 includes the RTP. RTP allows for discontinuous transmission (i.e., silence suppression) on any audio codec by observing the first data packet after the silence has a non-contiguous RTP timestamp with the end of the interval covered by the first data packet even though the RTP sequence number has incremented by only one. Generally, a data packet includes the actual data of interest (i.e., audio data) in the payload and a header that includes information about the data packet such as source address and destination address. In this embodiment, the audio data flows in one direction between communication system 110 and the transcription system 112. Specifically, the audio data flows only unidirectionally from the communication system 110 to the transcription system 112

Further, the API gateway 210 as shown is accessed using a REST API to read/write information available. The REST API is used by the API gateway 210's CTI monitor to interface with the communication system 110 and configure the communication system 110 to capture call events. The communication system 110 feeds the communications dynamics metadata to the API gateway over the REST API. In some embodiments, any of the REST APIs or other interfaces may be configured to enable differently configured transcription systems from the transcription system 112 to transcribe the stream of audio signals into text and tag the text with the communication dynamics metadata. In other embodiments, the REST API is replaced with a web-socket interface to interact with the API gateway 210 or the communication system 110. Further, other embodiments may include additional APIs and connection interfaces not shown here. In this embodiment, the trading application 214 manages user functionality of the trading environment 100. For example, the trading application 214 or communication system 110 may access a user database (not shown) to fetch trader specific information. This trader information includes indicators that inform the system if a specific trader has enabled transcription services. In some embodiments, the user communication devices 118 include a trading application 214 (also sometimes referred to a client-side user application). The trading application 214 operates to communicate with the application servers 410 discussed in association with FIG. 4

In some embodiments, the user communication device 118 includes a trading application 214 that is configured to capture the relevant communication dynamics metadata from the user communications device(s) 118 and supply that communication dynamics metadata to the communication system 110 and/or directly to the transcription system 112.

Figure 4:
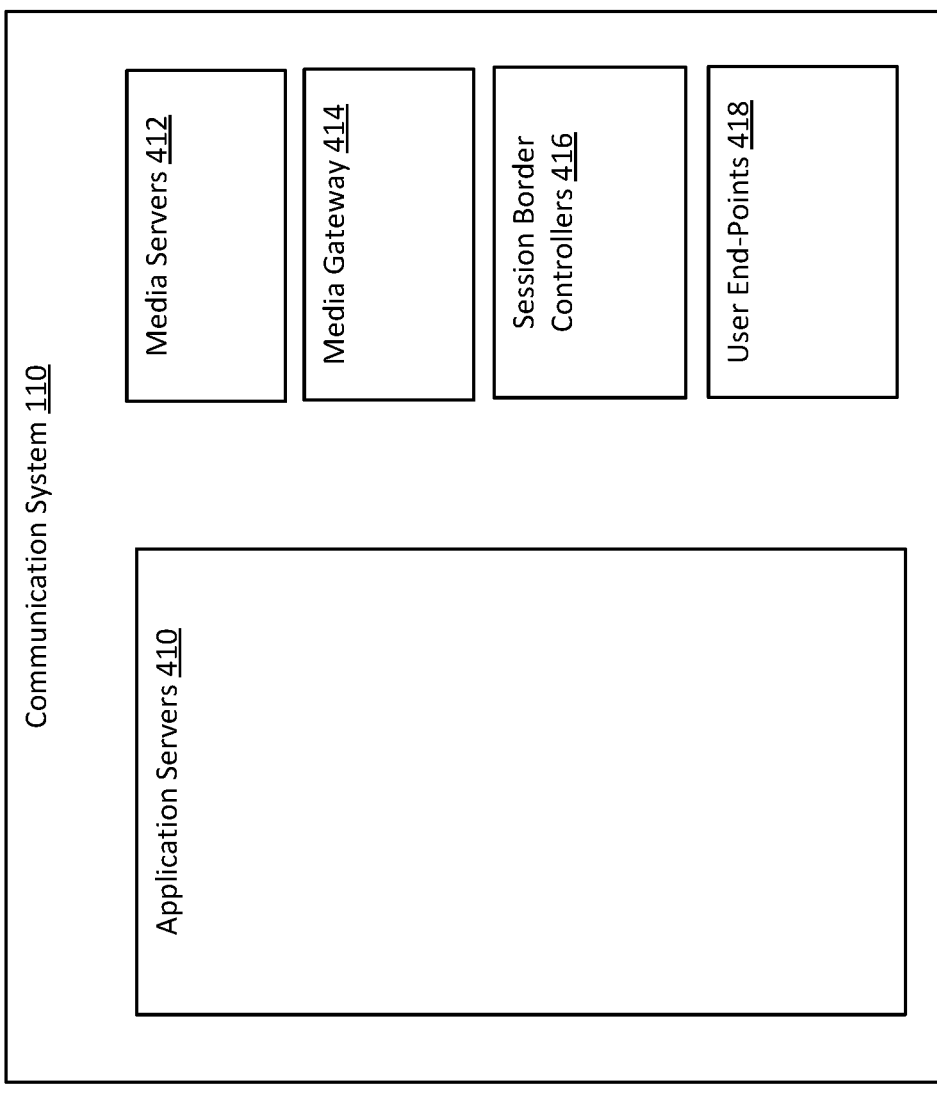
FIG. 4 illustrates a block diagram of example components of the communication system of FIG. 1.

FIG. 4 illustrates a block diagram of example components of the communication system of FIG. 1. In the shown embodiment, the communication system 110 includes application servers 410, media servers 412, media gateway 414, session border controllers 416, and user end-points 418.

In the shown embodiment, Application servers 410 may include the SIP signaling interface 310. Each of media servers 412, media gateway 414, session border controllers 416, and user end-points 418 may include the RTP media interface 314 for connecting to the transcription system 112. The application server 410 within communication system 110 acts as a 3rd Party Call Controller (3PCC) and facilitates media sessions between media servers 412 and the transcription system 112. Further, user equipment, such as user communication devices 118, utilizes SIP to facilitate a connection between the user equipment and application servers 410. Prior to starting the session, the user communication device 118 captures the communication (i.e., call, or video call). The media servers 412, media gateway 414, session border controllers 416, and user end-points 418 are all included in hosting and transmitting media to users 120 at user communication devices 118. Thus, each of the previous components includes the RTP media interface 314 to facilitate a media session between the components. In some embodiments, the media servers 412 includes terminal ports, mixers, streams, and dialogs. In other embodiments, the communication system 110 includes other components not shown here. Although shown as a single system or device, other embodiments include the communication system 110 distributed over a number of devices that include some or all of the shown components. Further, these devices may be connected over a wireless connection such as ethernet or a wireless connection such as Wi-Fi.

Figure 5:
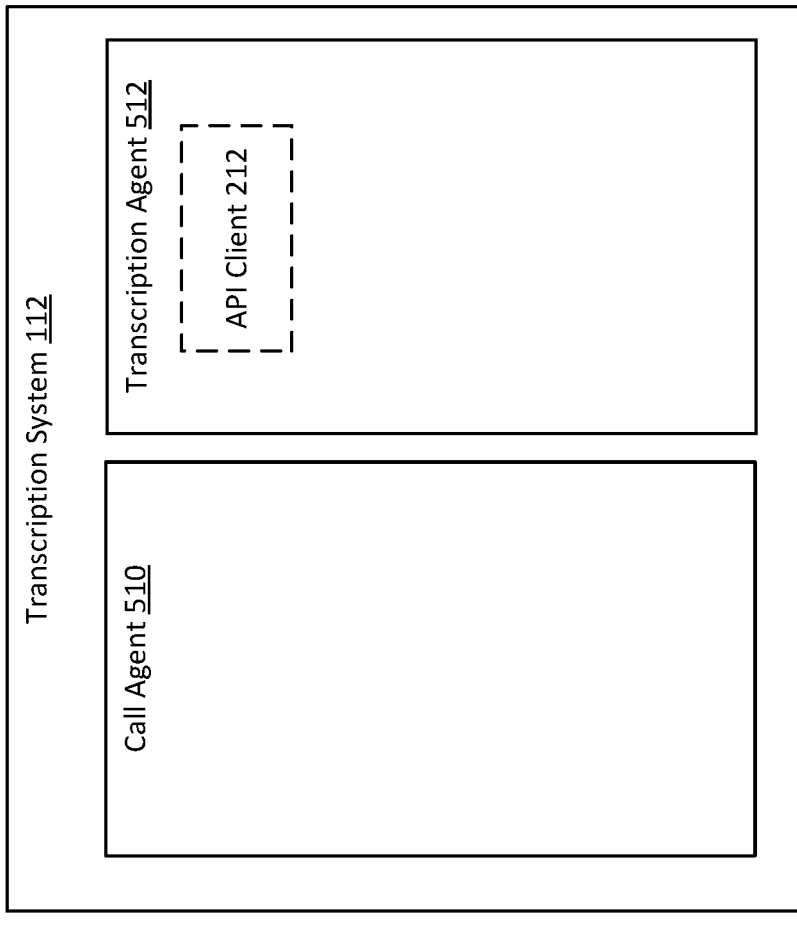
FIG. 5 illustrates a block diagram of example components of the transcription system of FIG. 1.

FIG. 5 illustrates a block diagram of example components of the transcription system of FIG. 1. In the shown embodiment, the transcription system 112 includes call agents 510 that monitor initiating sessions and exchanging media between other devices, such as user communication devices 118, and the transcription system 112.

In addition, the transcription system 112 includes transcription agents 512 that facilitate tagging the transcriptions through a connection to the API Gateway 210. Optionally, the transcription agent 512 includes the API client 212. The transcription system supports SIP for signaling and RTP for audio. Further, the transcription system 112 is configured to auto answer an incoming call over the SIP URI and supports both early and delayed offer with or without SDP in the initial invite. The transcription system 112 also handles re-INVITES (shown in FIG. 12). Further, the transcription system supports the UPDATE method over an API. Using the organization call-ID, the transcription system 112 can associate the forked call being transcribed with the communications dynamics metadata.

While shown as a single system, other embodiments may include additional computing devices to accomplish the above described tasks. Moreover, the call agents 510 and transcription agents 512 may perform additional tasks in the transcription and communication process.

Figure 6:
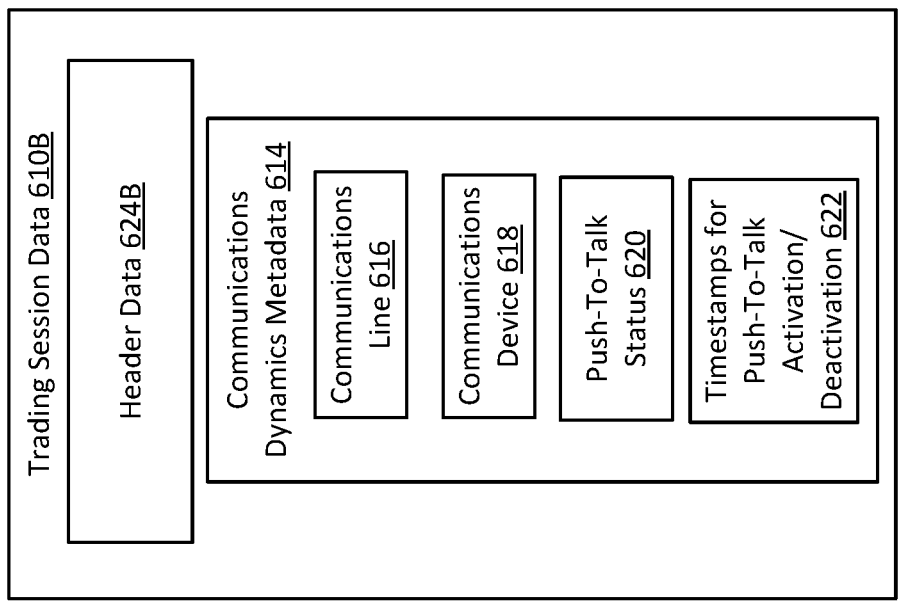
FIG. 6 illustrates a block diagram of trading session data packets exchanged between systems shown in FIG. 1 according to an example embodiment.

FIG. 6 illustrates a block diagram of trading session data packets exchanged between systems shown in FIG. 1 according to an example embodiment. In the illustrated embodiment, trading session data packet 610A includes media data 612 and header data 624. Further, trading session data packet 610B includes header data 624B and communication dynamics metadata 614, which includes communications line indicator 616, communications device indicator 618, push-to-talk status indicator 620, and time indicators for push-to-talk activation/deactivation 622. Other session metadata can also be included.

In the illustrated embodiment, the media data 612 is the audio data that is transmitted to the transcription system 112 for transcription and is the payload of trading session data packet 610A. Other forms of media may be included and shared such as video or text. Not all media data 612 may be transcribed. In the shown embodiment, the trading session data packet 610A is transmitted using RTP over the RTP media interface 314.

Communication dynamics metadata 614 indicates the occurrence of an event or type of entity that performed an action. In the shown embodiment, the communication dynamics metadata 614 includes a plurality of indicators of information about a call session. Communications line indicator 616 indicates which communication line connected to one of user communication devices 118 is activated. User communication devices 118 include multiple communication lines connecting to various other traders and external devices.

The communications line indicator 616 indicates which of these lines is being used for the call session between the specific trader and other party. The communications device indicator 618 indicates the device and/or the type of device is being used for the call session. For example, a trader of the users 120 may be using a connected headset to one of user communication devices 118 to talk during a call and listen during the call.

The communications device indicator 618 indicates the device and type of device being used in the conversation.

The push-to-talk status indicator 620 indicates whether a push-to-talk switch connected to one of user communication devices 118 has been activated or deactivated. For example, a user may operate the push-to-talk switch to enter the active state, thus allowing the user to talk through a connected microphone and be heard in the call session. Once finished, the user may operate the push-to-talk switch to enter the inactive state and the user cannot be heard through a connected microphone in the call session.

In the shown embodiment, the communication dynamics metadata 614 is the payload of trading session data packet 610B. The trading session data packet 610B and is transmitted using the REST APIs using HTTP over the API gateway 210.

Both the trading session data packet 610A and trading session data packet 610B include header data 624A and 624B. Header data indicates how a particular protocol or program, such as HTTP, SRTP, IP, or Ethernet is to direct the packet.

Additional data may be included as well. For example, the communication dynamics metadata 614 may include a type of the communications device, a type of the user-selected communications line, a type of a switch on the communications device that has been activated to enable a user's voice received at the communications device to be transmitted as audio via the user-selected communications line, a first time when the switch was activated, a later second time when the switch was deactivated, and/or a third time between the first time and the second time when the stream of audio signals began. This additional communication dynamics metadata can be tagged to the media data 612 that has been transcribed by the transcription system 112. Media data 612 that has been transcribed by the transcription system 112 is referred to as transcribed media data. In other embodiments, both the trading session data packets 610A and 610B may include other types of data as well, such as header information for various protocols. Moreover, the call events may include information that can help identify the transcription enabled user; for example, usernames and lines involved in the call, start and end time of the call, audio source such as left handset (LHS), right handset (RHS), and speaker channel used in the call.

Some of the features discussed in this disclosure are implemented using one or more computers. For example, the communication system 110, the transcription system 112, and the like may be implemented using various types of mobile devices, servers, and the like.

Figure 7:
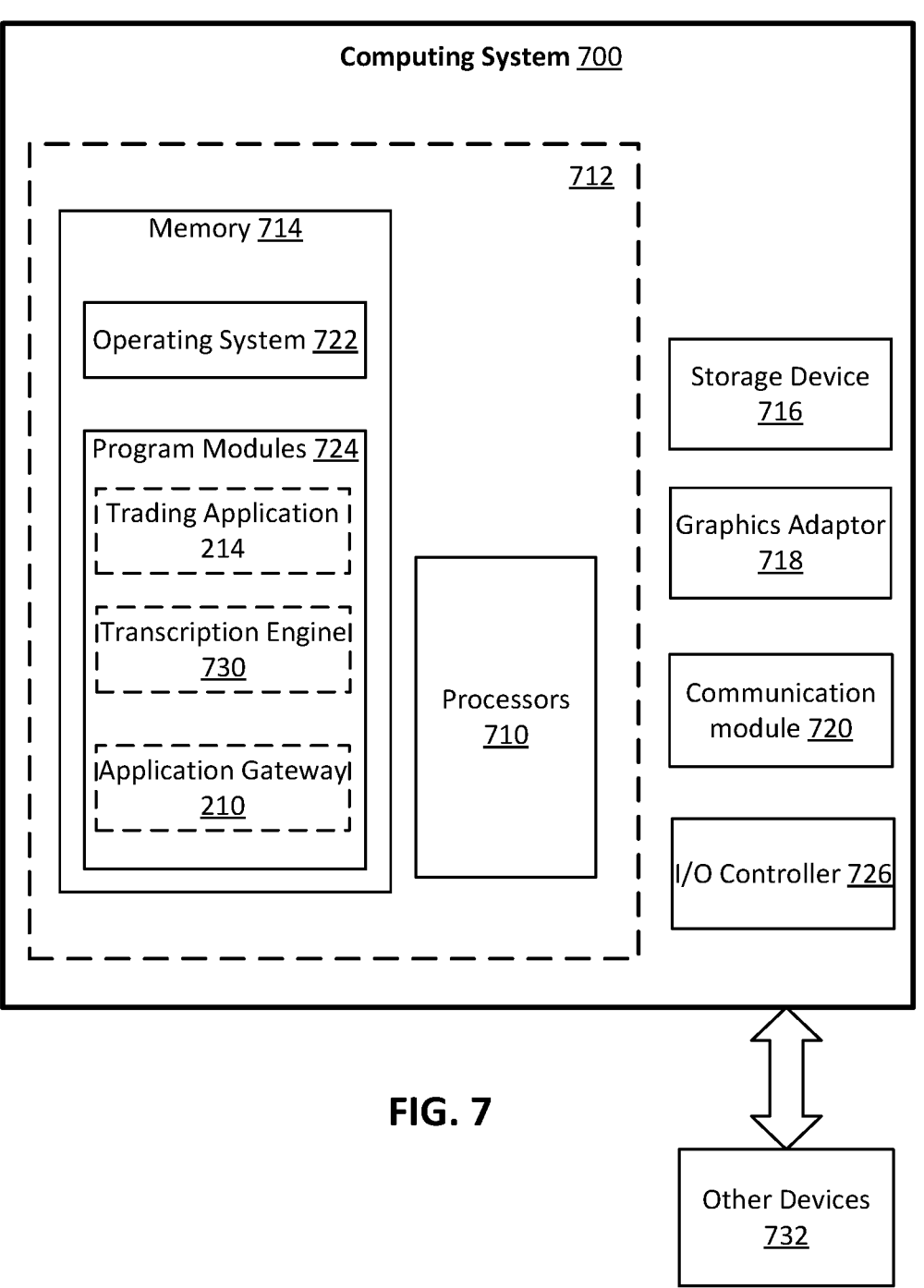
FIG. 7 illustrates a computing device that can perform various features and aspects of a communication and transcription system shown in FIG. 1 according to an example embodiment.

FIG. 7 illustrates a computing device that can perform various features and aspects of a communication and transcription system shown in FIG. 1 according to an example embodiment. Illustrated are the one or more processors 710 coupled to a chipset 712. Also coupled to the chipset 712 are a memory 714, a storage device 716, a graphics adapter 718, and a communication module 720. In one embodiment, the functionality of the chipset 712 is provided by the operating system 722, program modules 724, and an I/O controller 726. In another embodiment, the memory 714 is coupled directly to the processors 710 instead of the chipset 712.

The storage device 716 is any non-transitory computer-readable storage medium, such as a hard drive, compact disk read-only memory (CD-ROM), DVD, or a solid-state memory device. The memory 714 holds instructions and data used by the processors 710, such as executing trading application 214, transcription engine 730, or API gateway 210. Other applications, such as a tagging application may be included as well. The I/O controller 726 can connect to a pointing device that may be a mouse, track ball, or other type of pointing device, and is used in combination with a keyboard to input data into the computing system 700. The graphics adapter 718 displays images and other information on a connected display. The communication module 720 couples the computing system 700 to a network and other devices 732.

A computing system 700 can have different and/or other components than those shown. In addition, computing system 700 can lack certain illustrated components. For example, the computing system can be formed of multiple blade servers linked together into one or more distributed systems and lack components such as keyboards and displays. Moreover, the storage device 716 can be local and/or remote from the computing system 700 (such as embodied within a storage area network (SAN)).

V. Process

Figure 8:
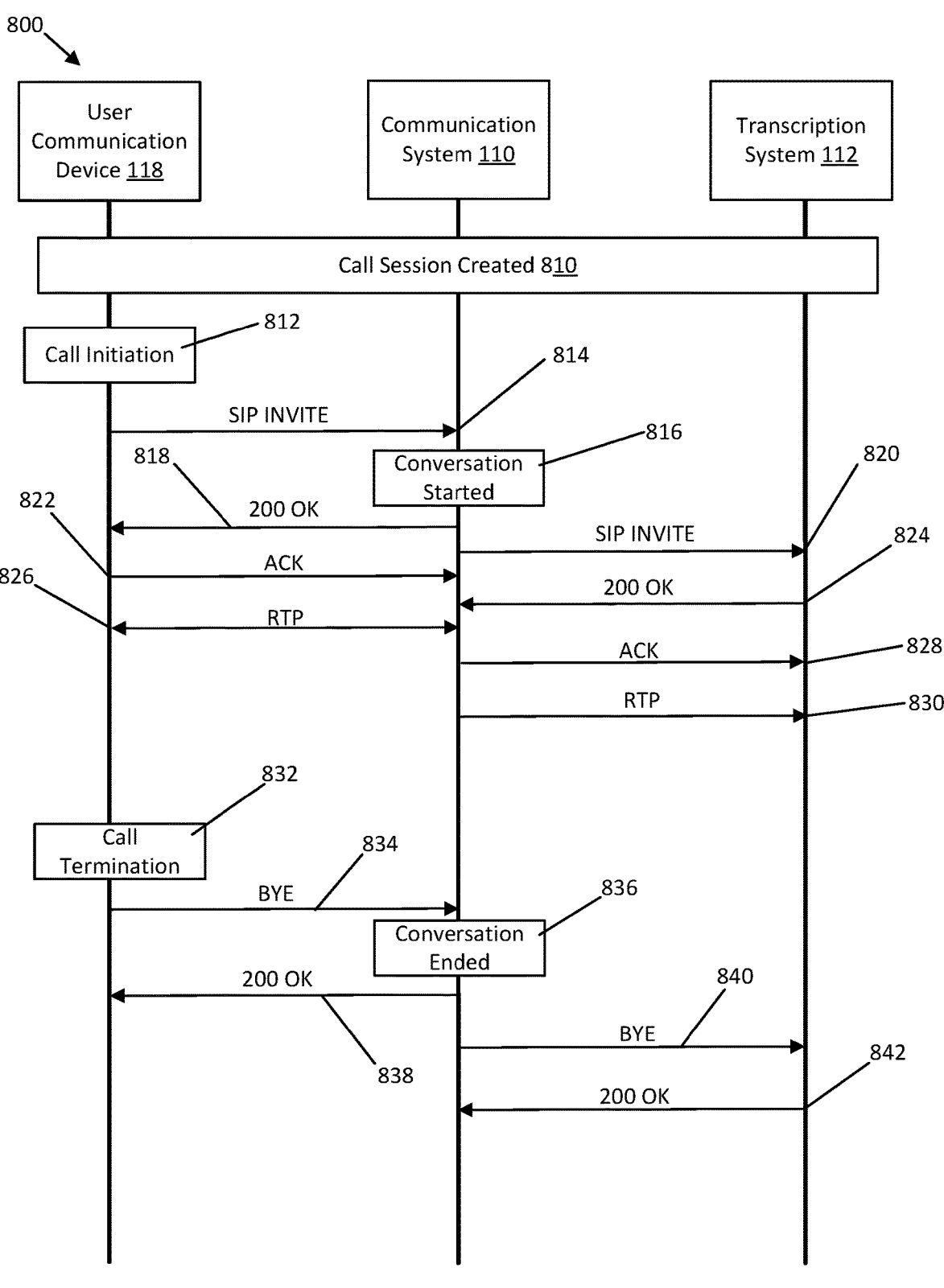
FIG. 8 illustrates a flow diagram of a trader communication device initiating a transcription session using the disclosed transcription system and communication system of FIG. 1 according to an example embodiment.

FIG. 8 illustrates a flow diagram of a trader communication device initiating a transcription session using the disclosed transcription system and communication system of FIG. 1 according to an example embodiment. In the shown embodiment, session initiation process 800 shows how the communication system 110 establishes a session with the transcription system 112 using the SIP signaling interface 310. The session is established when a transcription service enabled trader, such as one of users 120, starts a conversation by placing a new call, receives a call or is added into an existing call which is not yet being transcribed. While this scenario is shown in the context of user placing an outbound call, this scenario works equally well when the user receives a call or is added into an existing call. That is, the interaction between communication system and transcription system is the same in both cases for this embodiment. In other embodiments, the interaction may differ by adding or omitting operations.

In the shown embodiment, the session initiation process 800 includes a user communication device 118, the communication system 110, and the transcription system 112 as part of the session. At operation 810, the call session is created between the user communication device 118 and a second call participant not shown. User communication device 118 begins the call at operation 812. User communication device 118 sends SIP INVITE to the communication system 110 at operation 814. The SIP INVITE message includes a unique organization call-ID generated by the communication system for every call. At operation 816, the conversation has started, and the communication system 110 sends a status 200 OK indicating a successful SIP request at operation 818. The communication system 110 also sends its own SIP INVITE to the transcription system 112 to have it join the conversation to provide transcription services and tag communication dynamics metadata at operation 820. The SIP INVITE message includes a organization call-ID for session identification purposes. The transcription system 112 then sends a 200 OK message in response at operation 824. Responsive to receiving a 200 OK message, user communication device 118 sends an ACK message acknowledging the status at operation 822, and the communication system 110 does the same at operation 828. After the ACK message is sent, user communication device 118 begins the RTP session with the communication system 110 at operation 826 that exchanges media data over the RTP media interface 314. The RTP session begins with the communication system 110 and transcription system 112 at operation 830.

After the call has terminated at operation 832, user communication device 118 sends a BYE message at operation 834. This BYE message includes metadata indicator that the call session has ended. The conversation then ends at operation 836 and a 200 OK status code is sent in a response message to user communication device 118 at operation 838. To indicate the end of the conversation to the transcription system 112, the communication system 110 sends a BYE message at operation 840 to signal termination of the dialog. The transcription system 112 sends a 200 OK status code in a response message in operation 942.

Figure 9:
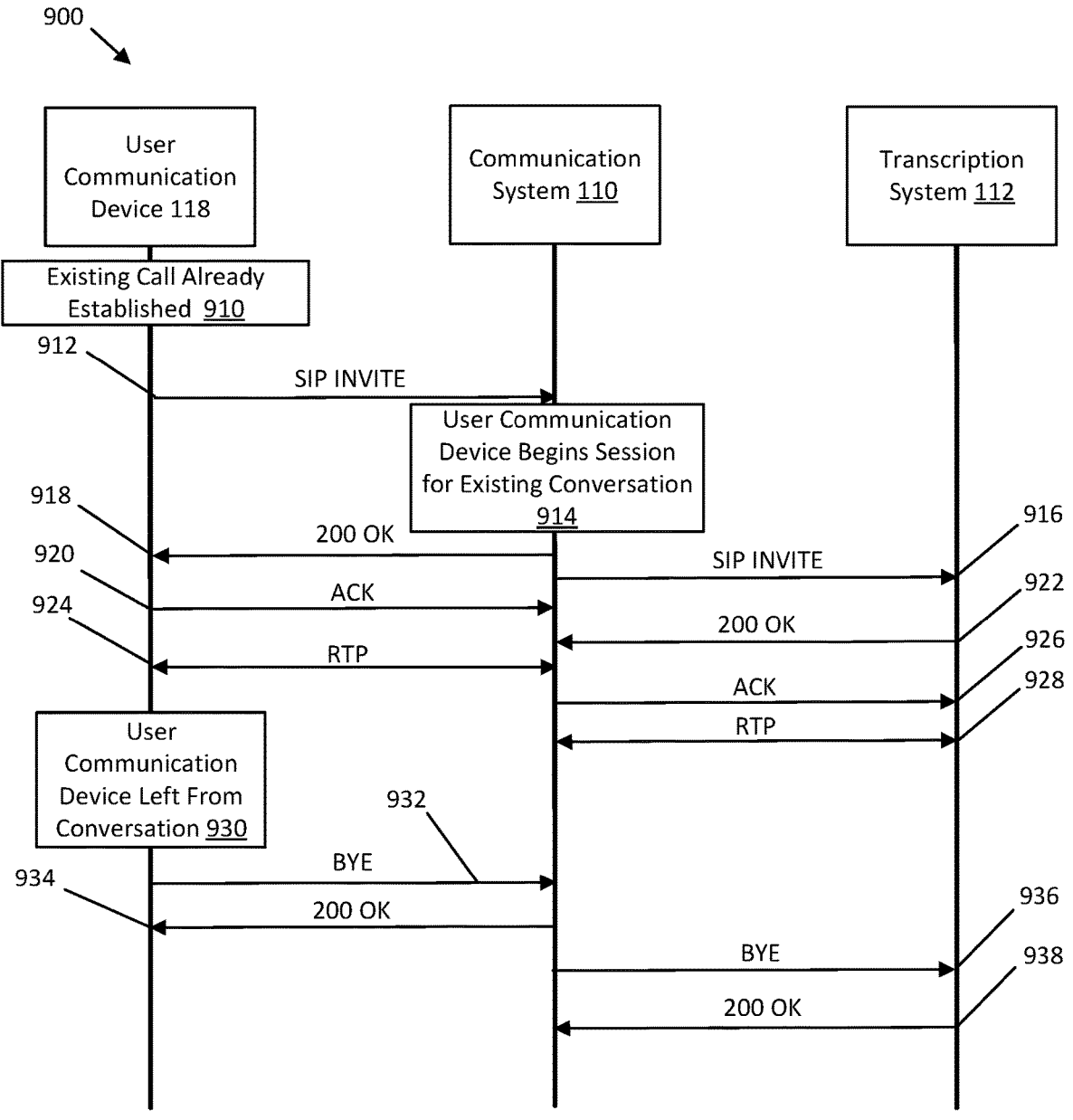
FIG. 9 illustrates a flow diagram of a trader communication device joining a call session and initiating a transcription session in accordance with the process described in FIG. 8 according to an example embodiment.

FIG. 9 illustrates a flow diagram of a trader communication device joining a call session and initiating a transcription session in accordance with the process described in FIG. 8 according to an example embodiment. Here, process 900 uses the same SIP interactions as process 800 to begin a transcription session for an already established call. In operation 910, the call is already established, and the user communication device joins an ongoing call. The session then conducts the same process as operations 814-830 in operations 912, 914, 916, 918, 920, 922, 924, 926, 928. To begin a transcription session for the user communication device 118's newly joined call.

In addition, process 900 similarly ends a transcription session when the user communication device 118 leaves a call without ending the call for all participants in operation 930. Operations 932, 934, 936, and 938 similarly correspond to operations 834, 838, 840, and 842.

Figure 10:
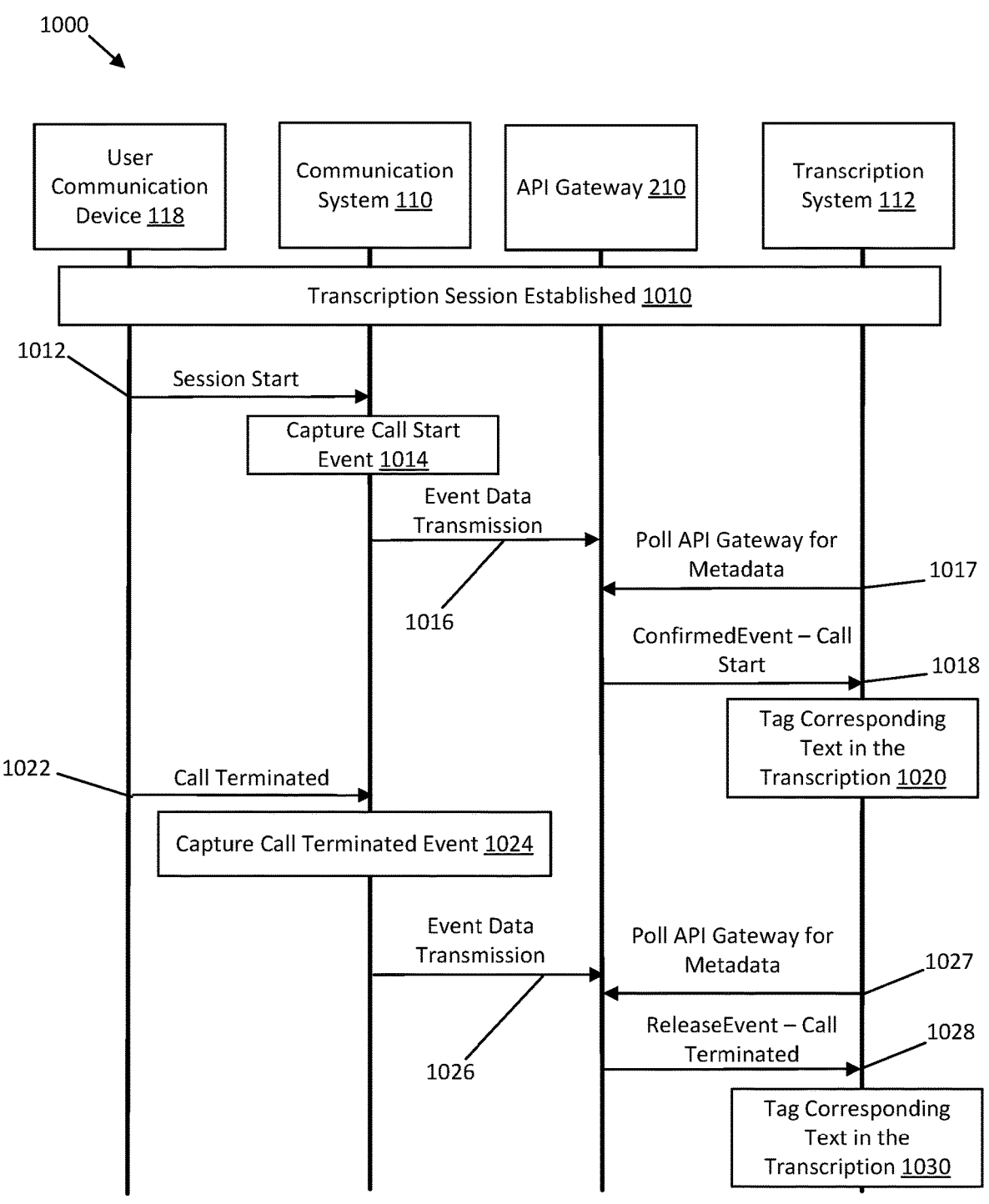
FIG. 10 illustrates a flow diagram of capturing initiating a call as shown in FIG. 8 and transmitting the corresponding communications dynamics metadata to the transcription system of FIG. 1 for tagging.

FIG. 10 illustrates a flow diagram of capturing a call event for initiating a call as shown in FIG. 8 and transmitting the corresponding communications dynamics metadata to the transcription system of FIG. 1 for tagging. In the shown embodiment, the transcription system 112 creates CTI monitors for the API gateway 210. The transcription system 112 subscribes to the API gateway 210's created monitors to pull the desired metadata. CTI monitors are used to cause the communication system 110 to capture events and provide the associated communications dynamics metadata to the API gateway 210 for holding. Once the CTI monitor is established, a transmitted call event is captured by communication system 110. Once captured, the communication system 110 can generate metadata indicating the event and transmit to the API gateway 210. API gateway 210 maintains the communication dynamics metadata until polled by transcription system 112. After the transcription system 112 polls the API gateway 210, the metadata event is then sent to transcription system 112 for extraction of the metadata event and tagging the transcription with the metadata event.

At operation 1010, a transcription session has been established between the user communication device 118, communication system 110, transcription system 112, and other call participants (not shown). At operation 1012, the user communication device 118 sends an indicator that the call session has begun. This message may be sent during the establishment of the call session at operation 1010 and process 800 or it may initiate the session itself. Once the communication system 110 has determined the call session has begun based on the user communication device 118 initiating the session at operation 1012, the communication system captures the call start event and generates communications dynamics metadata indicating as such in operation 1014. In some embodiments, the user communication device 118 captures the event and generates the communications dynamics metadata and sends the communications dynamics metadata in operation 1012. Once captured, the communication system 110 sends the metadata to the API gateway 210 using a REST API in an event data transmission at operation 1016 to the API gateway. The event data transmission includes the organization call-ID for the user's call session and a timestamp for when the call began. At operation 1017, the transcription system 112 polls the API gateway 210. This operation 1017 can occur periodically, e.g., at predefined polling intervals. In response to the polling signal 1017, the API gateway 210 sends the ConfirmedEvent—call start message to the transcription system 112 at operation 1018. The API gateway may transmit the confirmedevent message in response to the transcription retrieving or requesting the information in a corresponding message. The transcription system 112 then tags the corresponding text in the transcription at operation 1020 using the organization call-ID and timestamp included within the messages.

Once the call is terminated, the user communication device 118 indicates the termination to communication system 110 with a call terminated message at operation 1022. This message may also be sent over a CDR report message. Communication system 110 captures this event and generates corresponding communications dynamics metadata. The communication system 110 then sends the generated metadata to the API gateway 210, similarly to operation 1014 and 1016, in operations 1024 and 1026. At operation 1027, the transcription system 112 polls the API gateway 210 to cause the API gateway 210 to send the communications dynamics metadata. The API gateway transmits a ReleaseEvent—call terminated message including the metadata for tagging to transcription system 112 at operation 1028. Using the attached organization call-ID and timestamps, the transcription system 112 tags the text that the call ended at operation 1030.

While not shown, each of the shown systems and devices may send corresponding response messages that indicate a successful transmission such as a 200 OK message or ACK message. Further, some embodiments may include the user communication device 118 capturing the metadata as opposed to the communication system 110 as shown.

Figure 11:
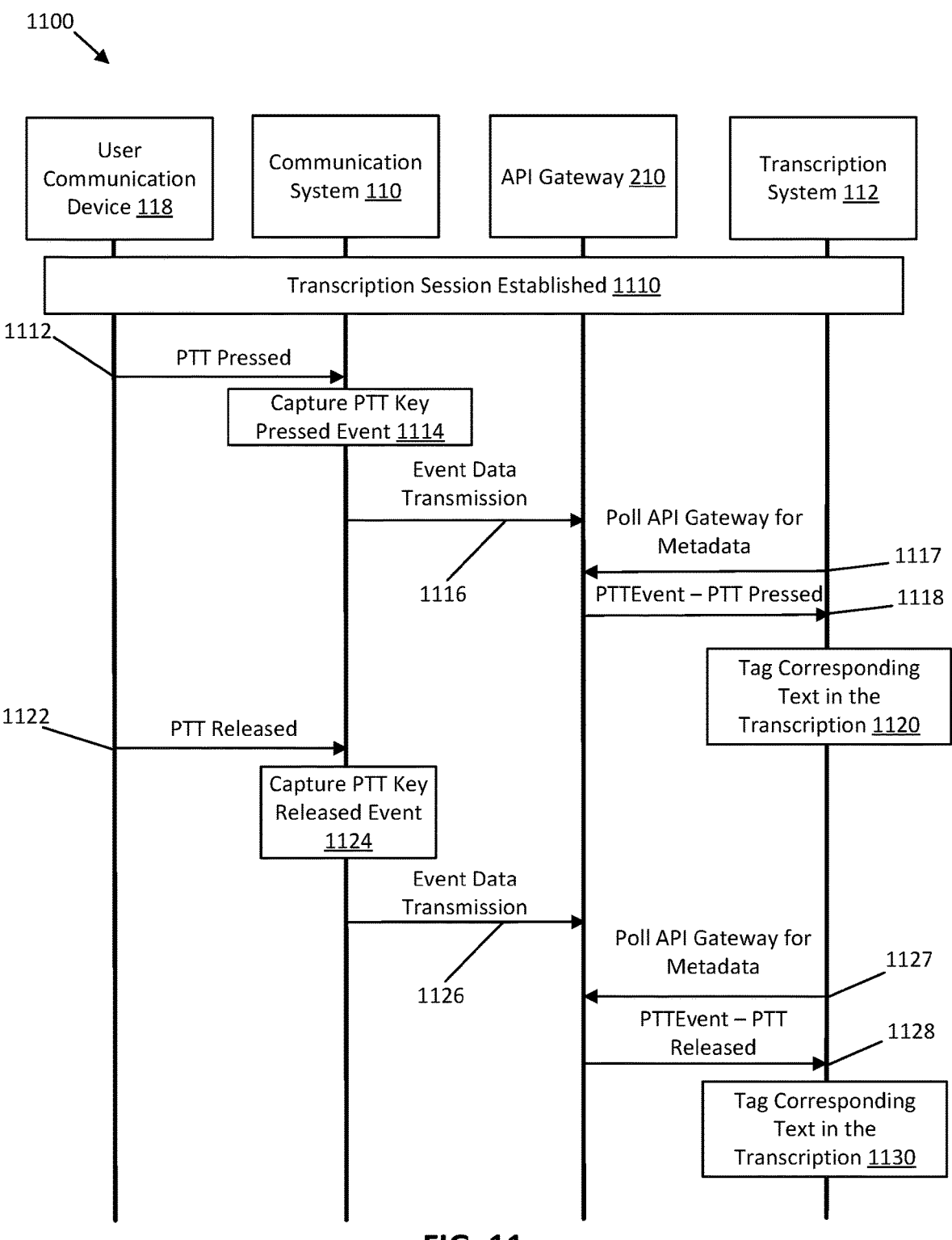
FIG. 11 illustrates a flow diagram of capturing a PTT switch being engaged and transmitting the corresponding communications dynamics metadata event to the transcription system of FIG. 1 for tagging during a call established using the process shown in FIG. 8.

FIG. 11 illustrates a flow diagram of capturing a metadata event of a PTT switch being engaged and transmitting the metadata event to the transcription system of FIG. 1 for tagging during a call established using the process as shown in FIG. 8. The trader audio is sent to the transcription system 112 when the PTT key is pressed. The stream is paused when the PTT key is released. Corresponding start and stop events are delivered to the transcription system 112. The trader audio is sent to the transcription system 112 when the PTT key is pressed. The stream is paused when the PTT key is released. Corresponding start and stop events are delivered to the transcription system 112. The transcription system logs this event so that it can easily be seen when a trader has pressed PTT. For example, an administrator may review the transcript to see which trader was talking, or an artificial intelligence (AI) bot/program may automatically review the transcript for compliance purposes. In some examples, the transcription session's receive stream may be being transcribed on active speaker calls regardless of the state of the PTT key.

Process 1100 includes the same or similar operations as described for process 1000, however, the captured event is a PTT switch being engaged or pressed and a PTT switch being released during the transcription session. The PTT switch is a component of the user communication device 118 in this embodiment that the user has pressed to begin speaking. Operations 1112, 1114, 1116, 1117, 1118, and 1120 correspond to operations 1012-1020. Once completed, the transcription system 112 has tagged the text of the transcription that a PTT switch of user communication device 118 was pressed at an indicated time. Further, operations 1122, 1124, 1126, 1127, 1128, and 1130 are executed in a similar way as 1112-1120. Once completed, the transcribed text will be tagged with an indication that the PTT switch of user communication device 118 is no longer engaged.

Figure 12:
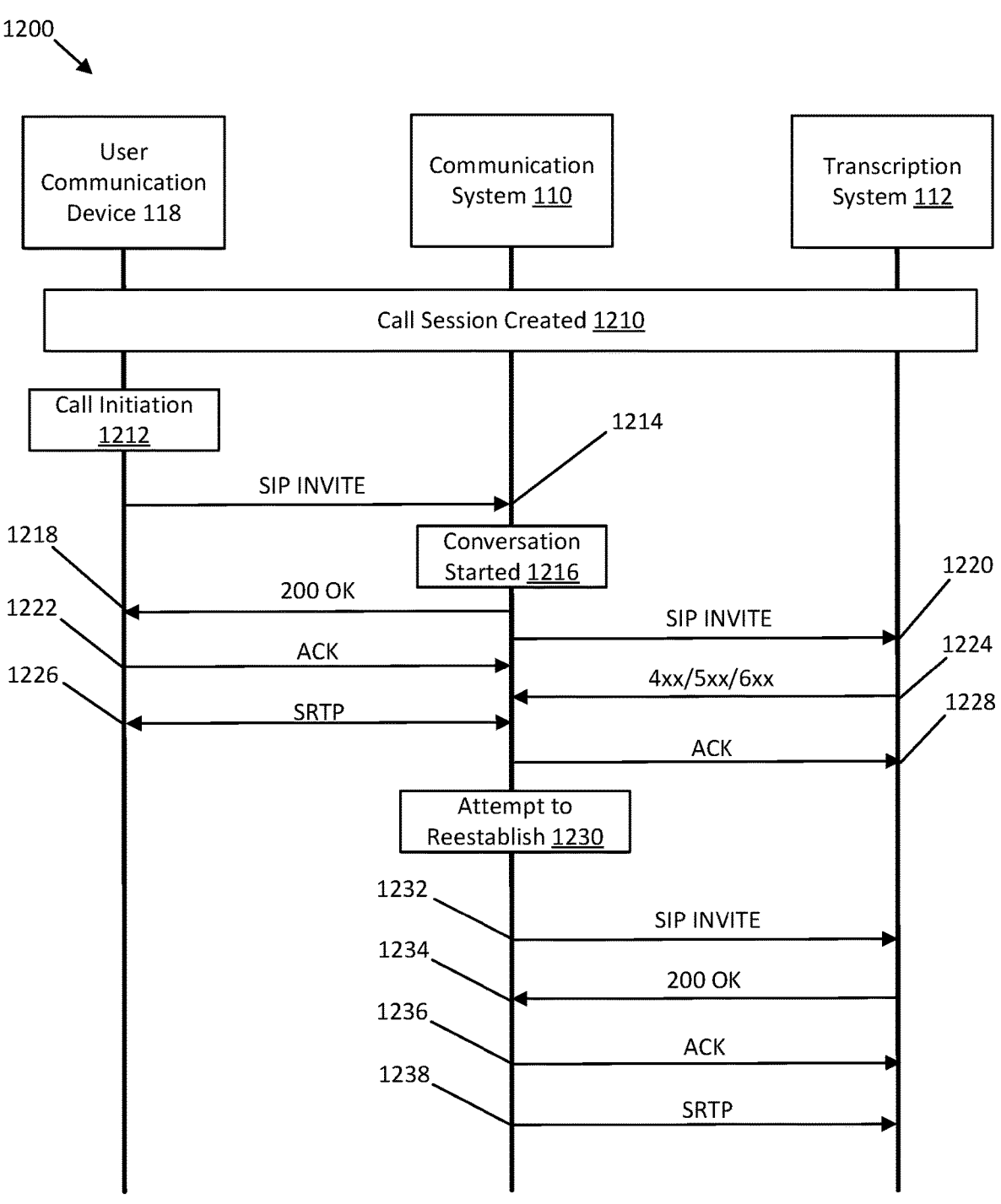
FIG. 12 illustrates a flow diagram of an error occurring during a transcription session established in FIG. 8 according to an example embodiment.

FIG. 12 illustrates a flow diagram of an error occurring during a transcription session established in FIG. 8 according to an example embodiment. In the shown embodiment, the communication system 110 receives an error message from the transcription system 112. The communication system 110 will continuously try to establish media session with the transcription system 112 upon receiving any error. The communication system 110 stops its retry when corresponding transcription service enabled user has dropped the call.

The shown embodiment demonstrates process 1200. The call session at operation 1210 is created between the user communication device 118, the communication system 110, and the transcription system 112. The initiation is the same at FIG. 8 for operations 1212, 1214, 1216, 1218, 1220, and 1222 which correspond to 812, 814, 816, 818, 820, and 822. However, the transcription system 112 sends an error message 4xx/5xx/6xx at operation 1224. After sending an ACK message at operation 1428 and beginning the SRTP session at operation 1426, the communication system 110 attempts to reestablish the session at operation 1230.

Operations 1232, 1234, 1236, and 1238 illustrate the transcription session successfully beginning as described previously once the communication system 110 has attempted to reestablish the transcription session. In some embodiments, the communication system 110 waits a predetermined threshold amount of time before executing operations 1232-1238. After waiting the predetermined threshold amount of time, the communication system 110 refeeds a stream of audio signals and the metadata (including communication dynamics metadata) to the transcription system 112.

Figure 13:
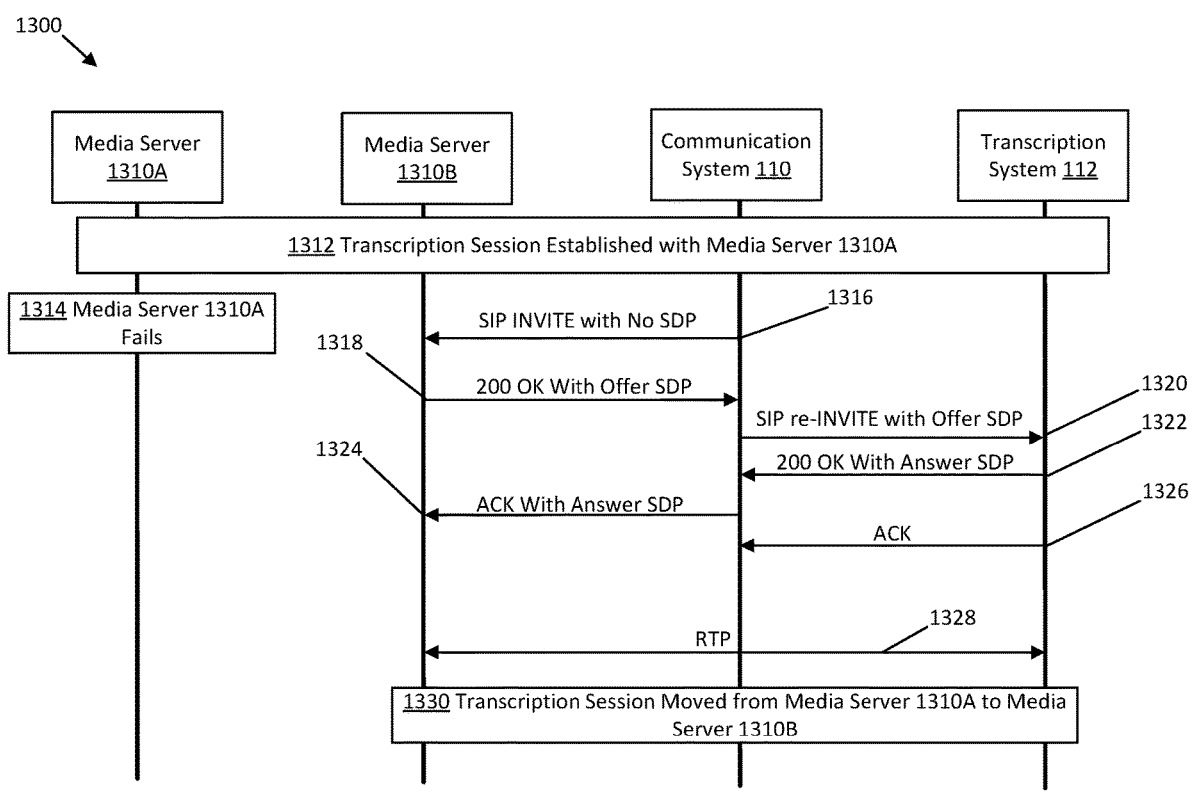
FIG. 13 illustrates a flow diagram of transferring a transcription session from a first media server to a second media server using the communication system and transcription system of FIG. 8 according to an example embodiment.

FIG. 13 illustrates a flow diagram of transferring a transcription session from a first media server to a second media server using the communication system and transcription system of FIG. 8 according to an example embodiment. Failure of a media server will cause a short interruption in media transcription on existing transcription sessions which are part of the failed media server.

In FIG. 13, the communication system 110 detects the media server failure and moves the media stream to the media server 1310B from the media server 1310A. The media server will receive a new INVITE and the transcription system 112 receives a re-INVITE on the existing SIP dialog.

As shown in process 1300, a transcription session has been established with media server 1310A, the communication system 110, and transcription system 112 at operation 1312. At operation 1314, the communication system 110 detects media server 1310A fails at operation 1314. The communication system 110 begins initiating a session with media server 1310B at operation 1316 by sending a SIP INVITE with No SDP. The media server 1310B responds with 200 OK With Offer SDP message at operation 1318. The communication system 110 then begins transferring the stream to the transcription system 112 to enable tagging and transcribing data from media server 1310B at operation 1320 by sending a SIP re-INVITE message with Offer SDP at operation 1320.

The transcription system 112 responds at operation 1322 by sending a 200 OK with Answer SDP message. The communication system 110 then sends an ACK With Answer SDP message at operation 1324. The transcription system 112 sends an ACK message at operation 1326. In certain examples, a SRTP session between the transcription system 112 and media server 1310B can begin indicating a successful transfer from the media server 1310A to the media server 1310B at operation 1528. As shown, the transcription session is moved from media server 1310A to the media server 1310B at operation 1330.

FIG. 14 illustrates a method for providing data for transcription using the communication system, transcription system, and trader communication device of FIG. 1 according to an example embodiment. Method 1400 may be performed by one or more previously described systems and/or components.

At operation 1410, the system feeds, during an audio call, a stream of audio signals transmitted by a communications device via a user-selected communications line to a transcription system. The user communications line and device may be one or more of user communication devices 118 connected to turret systems 116 and the IP network 114. A communications device is any device configured to establish a communications line with another communications device. A communications line is a pathway for transmitting and/or receiving audio signals. Examples of communications devices include but are not limited to turrets (both soft and hard). Other examples of communications devices include a headset, handset, microphone, intercom, or other devices with the ability to receive input and communicate output in the form of audio signals, and any other communications devices described herein. The transcription system may be transcription system 112 in some examples.

At operation 1412, the system feeds communications dynamics metadata generated by the communications device to an API gateway. The communications dynamics metadata is configured to be retrieved via the API gateway by the transcription system. The received metadata may be any of the described communication dynamics metadata in association with FIG. 6 or other related metadata described herein. Further, the API gateway may be the API gateway 210 and retrieved using a REST API connected to a corresponding client such as API client 212.

In some examples, the method 1400 includes operations 1414 and 1416.

At operation 1414, the system transcribes, using the transcription system, the stream of audio signals into text. Transcribing may be accomplished through natural language understanding (NLU) processing, machine learning models for mapping audio signals to text, or other speech-to-text algorithms.

At operation 1416, the system tags, using the transcription system, the text with the metadata, including communication dynamics metadata. The tagged text may take the form of secondary text placed near the tagged transcription such as beneath, above, or in the margin of the transcription. In other embodiments, the tagged metadata may be in footnotes or endnotes that have corresponding numbers next to the tagged transcription.

The tagged text with metadata can then be processed and analyzed to identify events and parameters as previously described that occurred during the call outside of standard speech. For example, an administrator may consult the transcription to determine who spoke what specific text. In other embodiments, the administrator may consult the text to determine the source communication line of the transcribed text, thus, indicating who the user was addressing during the call session. After consulting the transcription text and tags, the administrator can determine that the trader conveyed information to an acceptable party and is in compliance with financial regulations. The administrator may a be a human. In other examples, the administrator may be a virtual or digital administrator programmed to scan the transcription for compliance purposes and generate alerts (e.g., via an output device) when a compliance issue is flagged.

VI. Example Embodiments

According to one example, a system for transcribing audio calls during a trading session comprises: one or more processors; and one or more memory devices coupled to the one or more processors and storing data instructions that, when executed by the one or more processors, cause the one or more processors to: feed, during an audio call, a stream of audio signals transmitted by a communications device via a user-selected communications line to a transcription system; and feed, during the audio call, communication dynamics metadata generated by the communications device to an API gateway, the communications dynamics metadata being configured to be retrieved via the API gateway by the transcription system, the communication dynamics metadata indicating at least one of: (i) an audio source of a plurality of audio sources of the communications device; (ii) a type of the user-selected communications line; (iii) a type of a switch on the communications device that has been activated to enable a user's voice received at the communications device to be transmitted as the stream of audio signals via the user-selected communications line; (iv) a first time when the switch was activated and a later second time when the switch was deactivated; or (v) a third time between the first time and the second time when the stream of audio signals began.

In other examples the stream of audio signals and the communication dynamics metadata are configured in one or more data formats that enable the transcription system to: transcribe the stream of audio signals into text; and tag the text with the communication dynamics metadata. In other examples, the stream of audio signals and the communications dynamics metadata have associated therewith a same identifier, the identifier being associated with the communications device; and the identifier is configured to be used by the transcription system to tag the text with the communications dynamics metadata. In other examples, the API gateway is configured to enable a differently configured transcription system to retrieve the communication dynamics metadata from the API gateway. In other examples, the communications dynamics metadata is embedded in call events associated with the audio call, the call events are provided to the API gateway, the API gateway converts the call events into one or more extensible markup language (XML) files. In other examples, the system further comprises a user application configured to extract the communications dynamics metadata from the one or more XML files to provide extracted metadata. In other examples, the extracted metadata is configured to be retrieved by the transcription system from the user application to tag, by the transcription system, transcribed text of the stream of audio signals with the extracted metadata. In other examples, the call events include one or more of the communication device joining a call, a push-to-talk switch being activated, or a push-to-talk switch being de-activated. In other examples, the system further comprises the transcription system. In other examples, the instructions, when executed by the one or more processors, cause the one or more processors to: receive, via a user interface, an address for the transcription system, the receive enabling the transcription system to retrieve the communications dynamics metadata via the API gateway.

According to other examples, a non-transitory computer-readable medium has stored thereon one or more sequences of instructions for causing one or more processors to perform: feeding, during an audio call, a stream of audio signals transmitted by a communications device via a user-selected communications line to a transcription system; and feeding, during the audio call, communication dynamics metadata generated by the communications device to an API gateway, the communications dynamics metadata being configured to be retrieved via the API gateway by the transcription system, the communication dynamics metadata indicating at least one of: (i) an audio source of a plurality of audio sources of the communications device; (ii) a type of the user-selected communications line; (iii) a type of a switch on the communications device that has been activated to enable a user's voice received at the communications device to be transmitted as the stream of audio signals via the user-selected communications line; (iv) a first time when the switch was activated and a later second time when the switch was deactivated; or (v) a third time between the first time and the second time when the stream of audio signals began.

In other examples, the stream of audio signals and the communication dynamics metadata are configured in one or more data formats that enable the transcription system to: transcribe the stream of audio signals into text; and tag the text with the communication dynamics metadata. In other examples, the stream of audio signals and the communications dynamics metadata have associated therewith a same identifier, the identifier being associated with the communications device; and the identifier is configured to be used by the transcription system to tag the text with the communications dynamics metadata. In other examples, the API gateway is configured to enable a differently configured transcription system to retrieve the communication dynamics metadata from the API gateway. In other examples, wherein the communications dynamics metadata is embedded in call events associated with the audio call; the call events are provided to the API gateway; and the API gateway converts the call events into one or more extensible markup language (XML) files. In other examples, the one or more processors are further caused to perform: causing a user application to extract the communications dynamics metadata from the one or more XML files to provide extracted metadata. In other examples, the extracted metadata is configured to be retrieved by the transcription system from the user application to tag, by the transcription system, transcribed text of the stream of audio signals with the extracted metadata. In other examples, the call events include one or more of the communications device joining a call, a push-to-talk switch being activated, or a push-to-talk switch being de-activated. In other examples, the one or more processors are further caused to perform: receiving, via a user interface, an address for the transcription system, the receive enabling the transcription system to retrieve the communications dynamics metadata via the API gateway.

According to further examples, A computer implemented method, comprising: feeding, during an audio call, a stream of audio signals transmitted by a communications device via a user-selected communications line to a transcription system; and feeding, during the audio call, communication dynamics metadata generated by the communications device to an API gateway, the communications dynamics metadata being configured to be retrieved via the API gateway by the transcription system, the communication dynamics metadata indicating at least one of: (i) an audio source of a plurality of audio sources of the communications device; (ii) a type of the user-selected communications line; (iii) a type of a switch on the communications device that has been activated to enable a user's voice received at the communications device to be transmitted as the stream of audio signals via the user-selected communications line; (iv) a first time when the switch was activated and a later second time when the switch was deactivated; or (v) a third time between the first time and the second time when the stream of audio signals began.

According to additional examples, a computer-implemented method, comprises receiving a request to join an audio call to provide transcription services; receiving, during the audio call and via an API, a feed of a stream of audio signals and communication dynamics metadata in one or more data formats, the communication dynamics metadata indicating at least one of: (i) a type of the communications device; (ii) a type of the user-selected communications line; (iii) a type of a switch on the communications device that has been activated to enable a user's voice received at the communications device to be transmitted as audio via the user-selected communications line; (iv) a first time when the switch was activated and a later second time when the switch was deactivated; or (v) a third time between the first time and the second time when the stream of audio signals began; and transcribing the stream of audio signals into text; and tagging the text with the communication dynamics metadata.

It should be understood that the FIGS. 1-14 are presented for example purposes only. The architecture of the example embodiments presented herein is sufficiently flexible and configurable, such that it may be utilized (and navigated) in ways other than that shown in the accompanying figures.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system for transcribing audio calls during a trading session, the system comprising:
  one or more processors; and
  one or more memory devices coupled to the one or more processors and storing data instructions that, when executed by the one or more processors, cause the one or more processors to:
    feed, during an audio call, a stream of audio signals transmitted by a communications device via a user-selected communications line to a transcription system; and
    provide, during the audio call, communication dynamics metadata generated by the communications device to an application programming interface (API) gateway, the communications dynamics metadata being configured to be retrieved via the API gateway by the transcription system, the communication dynamics metadata indicating at least one of:
      (i) an audio source of a plurality of audio sources of the communications device;
      (ii) a type of the user-selected communications line;
      (iii) a type of a switch on the communications device that has been activated to enable a user's voice received at the communications device to be transmitted as the stream of audio signals via the user-selected communications line;
      (iv) a first time when the switch was activated and a later second time when the switch was deactivated; or
      (v) a third time between the first time and the second time when the stream of audio signals began;
    wherein the communications dynamics metadata is embedded in call events associated with the audio call;
    wherein the call events are provided to the API gateway; and
    wherein the API gateway converts the call events into one or more data storage files.

2. The system of claim 1, wherein the stream of audio signals and the communication dynamics metadata are configured in one or more data formats that enable the transcription system to:
  transcribe the stream of audio signals into text; and
  tag the text with the communication dynamics metadata.

3. The system of claim 2,
  wherein the stream of audio signals and the communications dynamics metadata have associated therewith a same identifier, the identifier being associated with the communications device; and
  wherein the identifier is configured to be used by the transcription system to tag the text with the communications dynamics metadata.

4. The system of claim 1, wherein the API gateway is configured to enable a differently configured transcription system to retrieve the communication dynamics metadata from the API gateway.

5. The system of claim 1, further comprising a user application configured to extract the communications dynamics metadata from the one or more data storage files to provide extracted metadata.

6. The system of claim 5, wherein the extracted metadata is configured to be retrieved by the transcription system from the user application to tag, by the transcription system, transcribed text of the stream of audio signals with the extracted metadata.

7. The system of claim 1, wherein the call events include one or more communications devices joining a call, a push-to-talk switch being activated, or a push-to-talk switch being de-activated.

8. The system of claim 1, further comprising the transcription system.

9. The system of claim 1, wherein the instructions, when executed by the one or more processors, cause the one or more processors to:

receive, via a user interface, an address for the transcription system, the receive enabling the transcription system to retrieve the communications dynamics metadata via the API gateway.

10. A non-transitory computer-readable medium having stored thereon one or more sequences of instructions for causing one or more processors to perform:

feeding, during an audio call, a stream of audio signals transmitted by a communications device via a user-selected communications line to a transcription system; and providing, during the audio call, communication dynamics metadata generated by the communications device to an application programming interface (API) gateway, the communications dynamics metadata being configured to be retrieved via the API gateway by the transcription system, the communication dynamics metadata indicating at least one of:

(i) an audio source of a plurality of audio sources of the communications device;

(ii) a type of the user-selected communications line;

(iii) a type of a switch on the communications device that has been activated to enable a user's voice received at the communications device to be transmitted as the stream of audio signals via the user-selected communications line;

(iv) a first time when the switch was activated and a later second time when the switch was deactivated; or (v) a third time between the first time and the second time when the stream of audio signals began;

wherein the communications dynamics metadata is embedded in call events associated with the audio call;

wherein the call events are provided to the API gateway; and wherein the API gateway converts the call events into one or more data storage files.

11. The non-transitory computer readable medium of claim 10, wherein the stream of audio signals and the communication dynamics metadata are configured in one or more data formats that enable the transcription system to:

transcribe the stream of audio signals into text; and tag the text with the communication dynamics metadata.

12. The non-transitory computer readable medium of claim 11, wherein the stream of audio signals and the communications dynamics metadata have associated therewith a same identifier, the identifier being associated with the communications device; and wherein the identifier is configured to be used by the transcription system to tag the text with the communications dynamics metadata.

13. The non-transitory computer readable medium of claim 10, wherein the API gateway is configured to enable a differently configured transcription system to retrieve the communication dynamics metadata from the API gateway.

14. The non-transitory computer readable medium of claim 10, wherein the one or more processors are further caused to perform:

causing a user application to extract the communications dynamics metadata from the one or more data storage files to provide extracted metadata.

15. The non-transitory computer readable medium of claim 14, wherein the extracted metadata is configured to be retrieved by the transcription system from the user application to tag, by the transcription system, transcribed text of the stream of audio signals with the extracted metadata.

16. The non-transitory computer readable medium of claim 10, wherein the call events include one or more communications devices joining a call, a push-to-talk switch being activated, or a push-to-talk switch being de-activated.

17. The non-transitory computer readable medium of claim 10, wherein the one or more processors are further caused to perform:

receiving, via a user interface, an address for the transcription system, the receive enabling the transcription system to retrieve the communications dynamics metadata via the API gateway.

18. A computer implemented method, comprising:

feeding, during an audio call, a stream of audio signals transmitted by a communications device via a user-selected communications line to a transcription system; and providing, during the audio call, communication dynamics metadata generated by the communications device to an application programming interface (API) gateway, the communications dynamics metadata being configured to be retrieved via the API gateway by the transcription system, the communication dynamics metadata indicating at least one of:

(i) an audio source of a plurality of audio sources of the communications device;

(ii) a type of the user-selected communications line;

(iii) a type of a switch on the communications device that has been activated to enable a user's voice received at the communications device to be transmitted as the stream of audio signals via the user-selected communications line;

(iv) a first time when the switch was activated and a later second time when the switch was deactivated; or (v) a third time between the first time and the second time when the stream of audio signals began;

wherein the communications dynamics metadata is embedded in call events associated with the audio call;

wherein the call events are provided to the API gateway; and wherein the API gateway converts the call events into one or more data storage files.

\* \* \* \* \*